(12) United States Patent
Coehoorn et al.

(10) Patent No.: US 11,636,247 B2
(45) Date of Patent: Apr. 25, 2023

(54) THREE-DIMENSIONAL MASTER EQUATION SIMULATIONS OF CHARGE-CARRIER TRANSPORT AND RECOMBINATION IN ORGANIC SEMICONDUCTOR MATERIALS AND DEVICES

(71) Applicant: Simbeyond Holding B.V., Eindhoven (NL)

(72) Inventors: Reinder Coehoorn, Eindhoven (NL); Peter Arnold Bobbert, Nuenen (NL); Feilong Liu, Rizhao (CN); Jeroen Cottaar, Eindhoven (NL)

(73) Assignee: Simbeyond Holding B.V., Eindhoven (NL)

( * ) Notice: Subject to any disclaimer, the term of this patent is extended or adjusted under 35 U.S.C. 154(b) by 0 days.

(21) Appl. No.: 17/263,228

(22) PCT Filed: Jul. 25, 2019

(86) PCT No.: PCT/EP2019/070038
§ 371 (c)(1),
(2) Date: Jan. 26, 2021

(87) PCT Pub. No.: WO2020/021008
PCT Pub. Date: Jan. 30, 2020

(65) Prior Publication Data
US 2021/0165944 A1    Jun. 3, 2021

Related U.S. Application Data

(60) Provisional application No. 62/711,018, filed on Jul. 27, 2018.

(51) Int. Cl.
*G06F 30/367* (2020.01)
*G06F 111/10* (2020.01)

(52) U.S. Cl.
CPC ........ *G06F 30/367* (2020.01); *G06F 2111/10* (2020.01)

(58) Field of Classification Search
CPC ................... G06F 30/367; G06F 2111/10
See application file for complete search history.

(56) References Cited

U.S. PATENT DOCUMENTS

| 7,213,218 B2 | 5/2007 | Miura |
| 7,263,477 B2 | 8/2007 | Chen |
| 2014/0019101 A1 | 1/2014 | Li |

OTHER PUBLICATIONS

Blakesley et al. Simulating Photoconductive Atomic-Force Microscopy on Disordered Photovoltaic Materials Physical Review B 91, 144202, 2015 (Year: 2015).*

(Continued)

*Primary Examiner* — Rehana Perveen
*Assistant Examiner* — Cuong V Luu
(74) *Attorney, Agent, or Firm* — N.V. Nederlandsch Octrooibureau

(57) ABSTRACT

Three-dimensional master equation modeling for disordered semiconductor devices is provided. Charge transport is modeled as incoherent hopping between localized molecular states, and recombination is modeled as a nearest-neighbor process where an electron at a first location and a hole at a second location can recombine at either the first location or the second location. Here the first and second locations are any pair of nearest neighbor locations. We have found that this nearest neighbor recombination model performs substantially better than the conventional local recombination model where an electron and a hole must be at the same location to recombine. The recombination rate is modeled as a product of a prefactor $\gamma$, hopping rates and state occupancies. Importantly, we have found that sufficient simulation accuracy can be obtained by taking $\gamma$ to be given by an empirically derived analytic expression.

18 Claims, 11 Drawing Sheets

(56) References Cited

OTHER PUBLICATIONS

Zhou et al. Numerical Capacitance Analysis of Single Layer OLEDs Based on the Master Equation IEEE Transactions on Electron Devices, vol. 63, No. 12, Dec. 2016 (Year: 2016).*
Nowy et al. Light Extraction and Optical Loss Mechanisms in Organic Light-Emitting Diodes: Influence of the Emitter Quantum Efficiency Journal of Applied Physics 104, 123109, 2008 (Year: 2008).*
Holst et al. Elecron-hole recombination in disordered organic semiconductors: Validity of the Langevin formula Physical Review B 80, 23520, 2009 (Year: 2009).*
Pasveer et al., "Unified Description of Charge-Carrier Mobilities in Disordered Semiconducting Polymers", 2005, PRL 94, 206601.
Liu et al, "Effect of Coulomb correlation on charge transport in disordered organic semiconductors", 2017, Physical Review B 96, 205203.
De Vries et al., "Full quantum treatment of charge dynamics in amorphous molecular semiconductors", 2018, Physical Review B 97, 075203.
Zhou et al, "Simulation of Bipolar Organic Semiconductor Devices based on the Master Equation including Generation and Recombination", 2015, SISPAD 2015, Sep. 9-11, 2015, Washington, DC, USA.
Casalegno et al., "Numerical simulation of photocurrent generation in bilayer organic solar cells: Comparison of master equation and kinetic Monte Carlo approaches", 2013, The Journal of Chemical Physics 139, 024706.
Sharma et al. Recombination models for spatio-temporal Monte Carlo transport of interacting carriers in semiconductors. Applied Physics Letters 98, 242111 (2011).
Nelson et al. Trap-limited recombination in dye-sensitized nancrystalline metal oxide electrodes. Physical review B, 63, 205321.
Mensfoort et al. Predictive modeling of the current density and radiative recombination in blue poymer-based light-emitting diodes. J. Applied Physics 109, 064502, 2011.

* cited by examiner (a)

THREE-DIMENSIONAL MASTER EQUATION SIMULATIONS OF CHARGE-CARRIER TRANSPORT AND RECOMBINATION IN ORGANIC SEMICONDUCTOR MATERIALS AND DEVICES

FIELD OF THE INVENTION

This invention relates to simulation of semiconductor devices

BACKGROUND

Organic semiconductors are used in various types of electronic and opto-electronic devices, such as organic light-emitting diodes (OLEDs), organic photovoltaic (OM devices and organic transistors. The materials used are often structurally disordered (amorphous). The electrical conductivity is a result of "hopping" of the electrical charges between the molecules. Due to the disorder, the energy of the charges in the molecules varies quite randomly, and the distribution of "hopping-rates" between each pair of molecules is quite wide. As a result, the current density is not uniform, but filamentary. And if there are charges with opposite polarities (+ and −), as in OLEDs, the molecules at which they recombine (followed by light emission) after a mutual attraction process are not uniformly distributed.

The "gold standard" for predictively describing these complex processes is three-dimensional kinetic Monte Carlo (3D-KMC) simulation. Within 3D-KMC simulations, the actual positions of all charges are followed in time, taking the molecular energies, electric field and temperature into account. A disadvantage of this approach is the long simulation time. For OLEDs, obtaining a statistically correct result is at low voltages too computer-time consuming. A commonly used alternative approach, one-dimensional drift-diffusion (1D-DD) simulation, is much faster. However, such simulations neglect the actual 3D-randomness of the material, and only yield a spatially uniform current density. Accordingly, it would be an advance in the art to provide improved simulation of disordered semiconductor devices.

SUMMARY

This work provides improved charge transport modeling of disordered semiconductor devices. The general modeling framework employed is 3D master equation modeling. More specifically, charge transport is modeled as incoherent hopping between localized molecular states, and recombination is modeled as a nearest-neighbor process where an electron at a first location and a hole at a second location can recombine at either the first location or the second location. Here the first and second locations are any pair of nearest neighbor locations. We have found that this nearest, neighbor recombination model performs substantially better than the conventional local recombination model where an electron and a hole must be at the same location to recombine. The recombination rate is modeled as a product of a prefactor γ, hopping rates and state occupancies. Importantly, we have found that sufficient simulation accuracy can be obtained by taking γ to be given by an empirically derived analytic expression.

For the specific conditions and assumptions considered in detail below, the recombination rate prefactor is given by $$\gamma \cong 0.024 \frac{e^2}{\varepsilon_r \varepsilon_0 a k_B T} \exp\left[-0.154\left(\frac{\sigma}{k_B T}\right)^2\right].$$

It is expected that similar forms for the recombination rate prefactor can also be derived in other circumstances.

The main advantage of a recombination rate prefactor expressed in such a simple form is that it is independent of local conditions in the device, such as carrier concentrations. This simplicity greatly reduces run time compared to a situation where local variations in γ would have to be accounted for. As shown in detail below, this result for γ is surprising and unexpected, because many contributions to γ have a significant dependence on carrier concentrations (i.e., the curves on FIG. 12, parts (a)-(d)). However, the concentration dependence of the net result of FIG. 12 part (e) is much less, because the various concentration dependences mostly cancel each other out.

An exemplary embodiment of the invention is a computer implemented method of performing transport simulation of a disordered semiconductor device. The basic steps of the method are receiving an input specification of composition and geometry of the disordered semiconductor device, performing a three-dimensional master equation simulation of electron and hole transport and recombination based on the input specification, and providing simulated transport results of the disordered semiconductor device as an output. As indicated above, the three-dimensional master equation simulation has the features of: 1) charge transport is modeled as incoherent hopping between localized molecular states; 2) recombination is modeled as a nearest-neighbor process where an electron at a first location and a hole at a second location can recombine at either the first location or the second location (here the first location and the second location are any two nearest neighbors in a set of the localized molecular states), 3) the rate of the recombination is modeled as a product, of a prefactor γ, hopping rates and state occupancies, and 4) the prefactor γ is given by an empirically derived analytic expression.

Significant advantages are provided. The method enables carrying out simulations under conditions (e.g., low voltage) for which no KMC simulations are possible, and/or with much less simulation time. The approach is versatile, with no significant, limitations on the device geometries that can be modeled. It can be easily applied for various technical uses such as in processes for stack development in any type of device structure. Relevant included physics includes charge transport and light, generation and the simulation domain ranges from nanometers to micrometers. The main technical effect provided by this work is accurate simulation results in disordered semiconductor devices with significantly less simulation time than would be required by conventional simulation approaches. For example, the present approach is, at low voltages, orders of magnitude faster than 3D-KMC simulations, and still incorporates to a good degree of accuracy the effects of the molecular randomness on the non-uniform current density and recombination rate.

The present approach has numerous applications. Any kind of disordered semiconductor device can be simulated, including but not limited to: Organic Light-emitting Diodes (OLEDs), thin film organic solar cells, organic semiconducting multilayer systems and light emitting field effect transistors. Further applications includes displays, lighting, photodetectors and photovoltaic energy conversion. Some specific examples include: design of solar cells with enhanced light-to-power conversion and of OLEDs with enhanced light emission, charge transport modeling in organic semiconductor devices—from molecular to the device level, charge transport modeling in various organic and hybrid solar cells, and modeling of planar and bulk heterojunction and organic solar cells. Simulations as provided herein can be useful in the layer stack development environment such as in a factory manufacturing OLEDs or solar cells, where emission, current densities, recombination zone thicknesses etc. can be determined very quickly and efficiently with the aid of the model.

As indicated above, the input specification is of the geometry and composition of the disordered device(s) to be modeled. Here model input parameters such as the mean energy and energy width of the density of states are how composition enters the model. Before performing a simulation, parameter values are included or input in the model/simulation; this defines the problem that is to be solved in the geometry of a device. The input steps for the simulation of the model include input parameters for performing the calculations, define the system, the materials, layer thicknesses, and are used to instruct that the simulation is performed for a selected voltage and/or temperature or for multiple combinations of temperature and voltages. Other device parameters can also be varied in such simulations, such as layer thicknesses.

Also as indicated above, the output is simulated transport results. This output, can take many forms. For example, the output of the simulation can provide input for use in the process of OLED or solar cell stack development. This facilitates and accelerates processes for developing OLEDs. In another example, the results of the simulation can provide input to assess and permit control of, for example, charge injection, and transport and recombination processes in display technologies such as OLEDs, in addition to advanced optical and electrical characterization techniques and experimental validation. Using the results of the simulations, the technical personal is able to decide before conducting experiments which combination of layers, thickness of layers, and/or the type of materials are best used to design a layer stack for disordered semiconductor devices, and also how to interpret experiments already conducted in terms of parameter values describing processes or materials. The specific output of the simulations can include the current density, position-dependent current density, the local charge carrier density (i.e., electron and/or hole concentrations), and (for bipolar devices such as OLEDs) the local recombination rate. Other device characteristics that can be simulated are light emission(voltage) and light emission (current density) for light emitting devices, and voltage (absorbed light) and current density(absorbed light) for light absorbing devices like solar cells and photodetectors. Here the notation A(B) is a shorthand for "A as a function of B". The data generated by the calculations of the system can be placed in files to subsequently manipulate the data for displaying to a user the optimal device geometry.

Practice of the invention does not depend critically on how it is implemented. In all cases, simulation methods are computer implemented, but the details of that computer implementation don't matter. Some non-limiting examples follow. A software product that provides semiconductor device modeling as described herein is one such implementation. The simulation model can be implemented, for example, as embedded software in a device that can run on e.g., a microcontroller with memory, or it can be more complex such as software running with electronic components, e.g. a personal computer or a computer cluster. Another implementation is as a non-transitory computer readable medium, the medium readable by a processing circuit or general purpose computer and storing instructions run by the processing circuit or general purpose computer for performing methods as described herein. Alternatively the software comprising code for applying a simulation model as described herein can be downloadable via a network and loaded into memory of a computer used to perform the simulation. Another implementation is as a system or apparatus having at least one processor and at least one memory device connected to the processor configured to receive and perform methods as described herein.

A non-limiting example of a structure that can be simulated according to the present approach is an OLED structure having a metal cathode, an electron transport layer (ETL), an emissive layer (EML), a hole transport layer (HTL), an indium tin oxide (ITO) layer and a glass substrate. In such a layer structure light emission occurs predominantly from the EML. FIG. 3A shows an example of such a structure. In these layers, only electrons flow in the electron transport layer, and only holes flow in the hole transport layer, whereas the recombination and radiative decay occurs almost entirely in the emissive layer. This is shown in FIG. 4. By selecting the appropriate thicknesses of the layers it is possible to determine precisely where recombination occurs and to determine, for example, the thickness of the recombination zone and the current density. The methods and models described herein can be used advantageously in complex stack arrangements and devices to predict quickly and precisely properties such as the efficiency of the charge recombination, emissions and current densities. For example, layer thicknesses of the ETL, EML and HTL can be automatically determined to maximize light output by simulating as described above for various layer thicknesses and picking the design that works best.

More generally, one can consider a partial input specification of composition and geometry of the device to be designed. Simulations as above can be automatically done for several cases, where each case is defined by selecting values as needed for device parameters to complete the input specification. Typically a simulation space is defined by selecting the parameters to be varied in the design process, and the corresponding ranges over which they can vary. E.g., EML thickness in a range of 20 nm to 100 nm could be a first such parameter, ETL thickness in a range from 5 nm to 30 nm could be a second such parameter and WIT thickness in a range from 5 nm to 30 nm could be a third such parameter. The cases are determined by systematically exploring this simulation space and providing the resulting optimized device configuration as an output. In this example, the result would be optimized ETL, EML, HTL thicknesses as determined by simulations as described above. The optimization to be used depends on the kind of device being designed. E.g., for a light emitting diode, light emission at the device's intended operating point could be maximized. For a solar cell, parameters such as open circuit voltage, short circuit current and/or fill factor can be maximized.

DETAILED DESCRIPTION

I) Introduction

In the past decades, tremendous progress has occurred in the field of disordered organic semiconductors. For example, organic light-emitting diodes (OLEDs), composed of layers of amorphous organic thin film, have already entered the display and lighting markets. In order to understand the physics and speed up further device development, it is crucial to make use of device modeling techniques which can both describe the essential physics and be computationally efficient.

For unipolar devices, various methods have been applied to disordered organic semiconductor devices, including one-dimensional (1D) drift-diffusion (1D-DD) simulations, three-dimensional Kinetic Monte Carlo (3D-KMC) simulations, one-dimensional master equation (1D-ME) simulations, and three-dimensional master-equation (3D-ME) simulations. 1D-DD modeling is widely used for inorganic semiconductor devices. It has also been intensively used to model organic semiconductor devices, because the method is relatively simple and fast. However, the method has various limitations. For example, it assumes the system to be a continuous medium without explicitly including the details at the molecular level. These details are only implicitly included to a certain extent by making use of parameterized mobility functions that depend on the temperature T, charge carrier concentration c, and electric field F. The analytical expressions of the mobility function used are obtained from advanced 3D modeling methods. Limitations of this approach include the proper treatment of charge carrier relaxation effects and the treatment of molecularly-scale mixed materials such as used in the emissive host-guest layers in OLEDs.

The limitations of 1D-DD modeling can be overcome by 3D-KMC modeling, first proposed by Bässler. Assuming incoherent hopping of charge carriers between localized molecular states, 3D-KMC modeling provides a mechanistic way to predict the macroscopic device characteristics from microscopic processes at the molecular level. This approach mimics in a realistic manner the functioning of devices by simulating the actual time and spatially resolved hopping motion of all charge carriers in a 3D system. The method is not constrained to specific layer structures, and has, e.g., been applied successfully to predictively simulate the electroluminescence in complex multilayer white OLEDs. However, due to the inclusion of all microscopic-scale events, 3D-KMC simulation can be computationally expensive and is under some conditions infeasible, especially when the device simulation is carried out around or below the built-in voltage $V_{bi}$, where the net device current density is due to only a very small imbalance of the diffusive motion of charge carriers in the positive and negative field directions. Moreover, in practice, 3D-KMC simulations can also not be easily applied to simulate the transient device response as measured, e.g., using impedance spectroscopy.

Figure 1A:
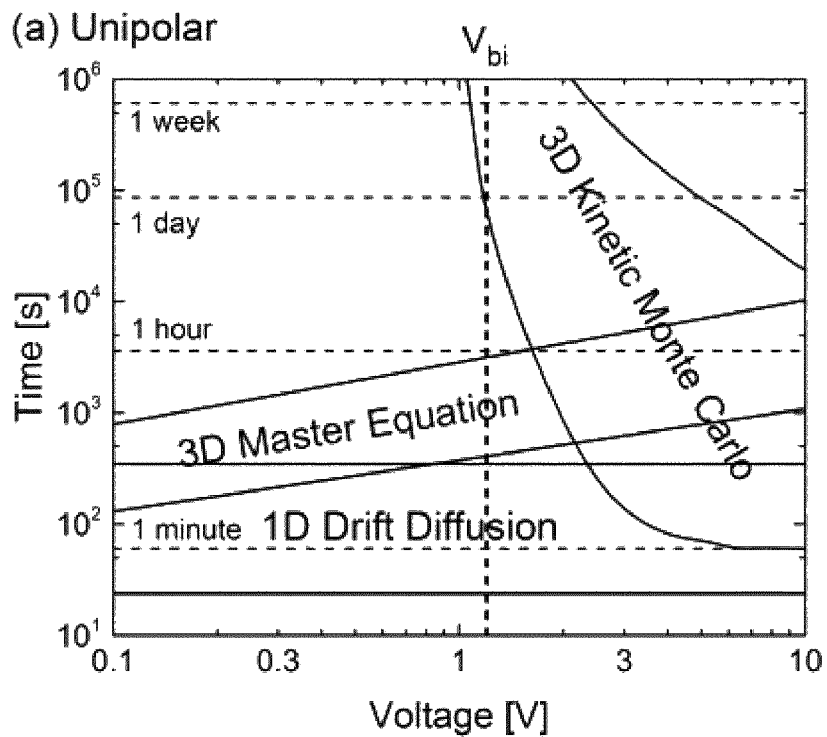
FIGS. 1A-B show exemplary simulation times for several simulation approaches vs. applied voltage.

Within master equation methods, the time-averaged instead of the actual charge carrier concentration on the molecular sites is calculated. In contrast to 1D-DD models, 1D-ME methods include in a natural way the discreteness of the molecular structure, also at internal interfaces. 3D-ME modeling can successfully bridge the gap between 1D-DD and 3D-KMC simulations. In 3D-ME device simulations, the Coulomb interaction between a charge carrier and all other charges in the device is included in an approximate manner, viz. by using the layer-averaged instead of the actual space-charge density. Recently, we demonstrated the possibility to extend this approach by including the effects of the actual Coulomb interaction between the same type of charge carriers, which plays a role at large carrier concentrations and low electric fields. On the one hand, these 3D-ME simulations of unipolar devices still include the effects of the energetically disordered 3D structure and the detailed intermolecular hopping rate functions, if needed depending on the detailed distribution of relative orientations, distances and transfer integrals between all molecules and based on a "full-quantum" approach that includes the effect of molecular reorganization by taking contributions from all vibrational modes into account. On the other hand, the method is generally computationally less expensive than 3D-KMC simulations, in particular below $V_{bi}$. This is shown in FIG. 1A, which gives typical values for the simulation time required to obtain for a 100 nm unipolar single-layer device the current density at room temperature with a 1% accuracy, using 1D-DD, 3D-ME and 3D-KMC simulations. The lower and upper limits are obtained for materials with a very weak and strong Gaussian disorder (standard deviations σ=0.05 and 0.12 eV), respectively. In addition to steady-state modeling, 3D-ME simulations can also be used to predict transient properties of devices, such as obtained using dark injection and impedance spectroscopy measurements. In these cases, 3D-ME simulations were found to provide a much better agreement with experimental results than 1D-DD simulations.

Here the 1D drift-diffusion (1D-DD) simulation employs the Bonham and Jarvis method, calculated with a Mathematica™ code on a standard desktop computer. The 3D master-equation (3D-ME) and 3D kinetic Monte Carlo (3D-KMC) simulations are performed on a computer cluster. The 3D-KMC simulation software used is Bumblebee, provided by Simbeyond B.V. (simbeyond.com) The 3D-ME simulation method is presented in this work. 1D-DD simulation is computationally the most efficient, but it is not mechanistic. At voltages below $V_{bi}$, 3D-ME is the only feasible approach capable of 3D predictive modeling. We note that when carrying out the simulations for a device based on a semiconductor with a larger energy gap, but with identical injection barriers, essentially identical results will be obtained when expressed relative to the (larger) value of $V_{bi}$. We furthermore note that the simulation time shown here is obtained for normal numerical precision, and that for different hardware configurations, coding techniques, and device parameters, the actual simulation time may vary strongly. The readers are suggested to focus more on the general trends shown in this figure rather than the exact values of the simulation time. In addition to steady-state modeling, 3D-ME simulations can also be used to predict transient properties of devices, such as obtained using dark injection and impedance spectroscopy measurements. In these cases, 3D-ME simulations were found to provide a much better agreement with experimental results than 1D-DD simulations.

So far, the use of 3D-ME modeling has almost exclusively been limited to unipolar devices. Extending unipolar 3D-ME modeling to bipolar transport is not trivial. It is not a priori clear how in 3D-ME simulations charge-carrier recombination and dissociation can be included in a manner that still allows predictive modelling of the device performance. Zhou et al. have proposed a 3D-ME method within which recombination is treated as a local process, with a rate proportional to the product of the electron and hole concentration on the molecule at which the recombination takes place and with a phenomenological rate coefficient that is treated as a free parameter. As will be shown in this work, such an approach incorrectly neglects the consequences of the long-range nature of the Coulomb interaction between electrons and holes. Casalegno et al. have developed a 3D-ME model that specifically focusses on organic solar cells. A key challenge is then to properly describe the dissociation probability of charge-transfer (CT) excitons with the electron and hole residing on adjacent donor and acceptor sites, respectively. Within that model, the rate for this process and for the competing processes such as recombination are obtained from the results of KMC simulations of these processes for isolated CT excitons. A disadvantage of this approach is that such initial KMC simulations should be repeated when considering system or experimental variations, affecting, e.g., the material structure, energetic disorder, the binding energy of excitons localized on each molecule, dielectric constants, temperature, and local electric field.

Figure 1B:
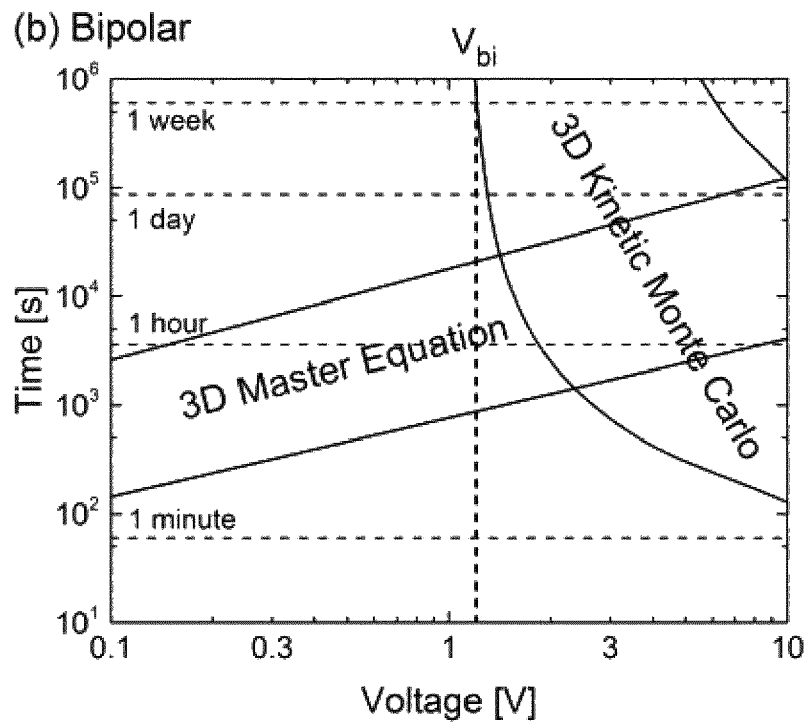

In this work, we develop a bipolar 3D-ME model for the charge transport and recombination processes in sandwich-type devices based on disordered organic semiconductor materials such as OLEDs, with the aim to provide a computationally efficient method for predictive device modeling at low voltages. The model describes recombination as resulting from an interaction between an electron and a hole residing on nearest-neighbor sites, with a rate of the final recombination step that includes the effects of the percolative nature of the long-distance electron and hole transport towards each other. Without loss of computational efficiency, recombination is thus described effectively as a non-local process. We show how the effective rate coefficient can be obtained by comparing the results of KMC simulations with the results of a simple average-medium approach within which a mean-field approximation is used, and demonstrate the approach for the case of materials with a Gaussian density of states. The electron-hole recombination process is thus simulated without free parameters. Within the version of the model described in this work, exciton formation is assumed to be followed by immediate radiative decay. However, the model is expected to provide a basis for efficient full 3D-ME device models that also include exciton transfer and exciton loss processes. We find that the use of the 3D-ME method developed in this work enables efficient simulations at voltages below $V_{bi}$. FIG. 1B gives the simulation time for a single-layer bipolar device with $V_{bi}$=1.2 V and shows a comparison with the time required for KMC simulations for the same device. We note that the same overall conclusions concerning the simulation time also hold for devices with larger values of $V_{bi}$.

The structure of this description is as follows. In Sec. II, the bipolar 3D-ME model is formulated by describing the simulation approach and the method for deriving the recombination rate used in the model. In Sec. III, we apply the model to single-layer and realistic three-layer devices. The current density-voltage J(V) characteristics, carrier concentration profile and recombination profile are compared with the results of 3D-KMC simulations, as well as the detailed site-resolved charge-carrier concentrations and recombination rates. Next, we compare the "local" versus "nearest neighbor" descriptions of recombination. Finally, we discuss, based on the simulations, the so-called ideality factor of bipolar devices, obtained from the simulated J(V) curves below $V_{bi}$. In the literature, measurements of the ideality factor have been used to deduce information about the nature of the recombination process. Sec. IV contains a brief summary and an outlook. Sec. V is supplementary information providing further details on the derivation of this approach.

II) The Bipolar 3D Master-Equation Model

A. Simulation Approach

In this section, the bipolar 3D-ME model is formulated. As in unipolar 3D-ME models for the charge transport in disordered organic semiconductors, we assume that the charge carriers occupy localized molecular states and that the charge transport is due to incoherent hopping between these states. The disordered organic semiconductor is described as a cubic lattice with a lattice constant α (typically α~1 nm), representing the actual molecular sites. All quantities referring to holes or electrons are denoted by superscripts h and e, respectively. The density of states (DOS) is assumed to be given by a Gaussian distribution with a width σ:

$$g(E) = \frac{1}{\sqrt{2\pi}\sigma} \exp\left(-\frac{E^2}{2\sigma^2}\right). \quad (1)$$

The charge carrier hopping rate between neighboring sites, $v_{ij}$, is described by the Miller-Abrahams (MA) formula:

$$v_{ij}^{h(e)} = v_1 \times \begin{cases} e^{-\Delta E_{ij}^{h(e)}/(k_B T)}, & \Delta E_{ij}^{h(e)} > 0, \\ 1, & \Delta E_{ij}^{h(e)} \leq 0. \end{cases} \quad (2)$$

Here $v_1$ is the hopping attempt rate to a first nearest neighbour (at a distance a), $k_B$ is the Boltzmann constant, $\Delta E_{ij}$ is the energy difference between sites j and i, and T is the temperature. We note that recent theoretical work has indicated that for amorphous organic semiconductors the MA-formula provides often a quite accurate description of vibrational-mode effects on the hopping rate, and that a description of the charge transport as obtained using MA-theory is often more accurate than a description obtained using the semiclassical Marcus theory. For simplicity, we assume in this work that the molecular wave functions decay rapidly in space so that the charge carriers can only hop between nearest neighbor sites. The hopping rates are deduced using the self-consistently calculated site energy differences $\Delta E_{ij}$ that include the intrinsic energy difference due to Gaussian disorder and the electrostatic potential difference between sites i and j, as obtained by solving the 1D-Poisson equation. In this approach, the Coulomb interaction with the space charge, averaged over each molecular layer, is thus taken into account, but the three-dimensional character of the actual Coulomb interaction between a charge and all other individual charges is neglected. When providing a comparison with the results from KMC simulations, we focus on systems within which Coulomb-correlation effects between carriers of the same polarity are very weak. The effect of the Coulomb attraction between carriers of opposite polarity, leading to recombination, is described in a manner as discussed below.

The time evolution of the hole and electron occupation probability (concentration) on site i, $c_i$, is determined by the hopping of holes or electrons from all neighboring sites j toward site i and vice versa (as in unipolar models), minus a contribution due to exciton formation:

$$\frac{dc_i^h}{dt} = \sum_j \left[ \begin{array}{c} v_{ji}^h c_j^h (1 - c_i^h) - v_{ij}^h c_i^h (1 - c_j^h) \\ -\gamma(\tilde{v}_{ji}^e + \tilde{v}_{ij}^h)(c_i^h c_j^e - c_{i0}^h c_{j0}^e) \end{array} \right], \quad (3a)$$

$$\frac{dc_i^e}{dt} = \sum_j \left[ \begin{array}{c} v_{ji}^e c_j^e (1 - c_i^e) - v_{ij}^e c_i^e (1 - c_j^e) \\ -\gamma(\tilde{v}_{ji}^h + \tilde{v}_{ij}^e)(c_i^e c_j^h - c_{i0}^e c_{j0}^h) \end{array} \right]. \quad (3b)$$

The coefficients $\gamma$ and the rates $\tilde{v}$ are defined and further discussed below. The exciton formation process is described as a special type of hopping process. When a hole is located on site i and an electron is located on a neighboring site j, an exciton formation event can occur and an exciton may be formed on either site i or j. The general structure of the exciton formation term is that of the Langevin recombination rate formula: the formation rate is proportional to the product of the electron and hole occupation probabilities on the two sites. At equilibrium, detailed balance is preserved by the thermal generation term $c_{i0}c_{j0}$, in which $c_{i0}$ and $c_{j0}$ are the equilibrium hole and electron concentrations at site i and j, respectively. The electron and hole concentrations at equilibrium are calculated self-consistently by solving the 1D-Poisson equation combined with Fermi-Dirac statistics. In this work, we assume that the excitons formed by electron-hole recombination decay immediately to the ground state. Excitonic interaction processes (such as exciton diffusion, exciton-exciton annihilation, exciton-polaron quenching, etc.) are thus not included. We intend to include such interactions in future work.

From the Langevin expression, the exciton formation rate is expected to be proportional to the sum of the electron and hole mobilities. The exciton generation term is therefore taken to be proportional to the sum of the local electron and hole hop rates, modified by taking into account that upon exciton formation these rates are affected by the exciton binding energy, $E_{exc,b}$:

$$\tilde{v}_{ij}^{h(e)} = v_1 \times \begin{cases} e^{-\Delta \tilde{E}_{ij}^{h(e)}/(k_B T)}, & \Delta \tilde{E}_{ij}^{h(e)} > 0, \\ 1, & \Delta \tilde{E}_{ij}^{h(e)} \leq 0, \end{cases} \quad (4)$$

with $$\Delta \tilde{E}_{ij}^{h(e)} = \Delta E_{ij}^{h(e)} - E_{exc,b}. \quad (5)$$

For disordered small-molecule organic semiconductors, $E_{exc,b}$ can be as large as 1 eV, or more. $E_{exc,b}$ depends on the exciton spin (singlet, triplet). For notational simplicity, we have omitted this dependence in Eq. (5). From the Langevin expression, it follows that the exciton formation rate prefactor $\gamma$ is proportional to $\varepsilon_r \varepsilon_0/e$, with $\varepsilon_r$ the dielectric constant, $\varepsilon_0$ vacuum permittivity, and e the elementary charge. The prefactor should furthermore take into account that for disordered materials the mobility that would follow within a mean-field approach from the average of the hopping rates between nearest neighbor sites, employed in Eq. (2), is much larger than the actual value. In Sec. IIB, we develop an analytical expression for $\gamma$.

The set of coupled equations given by Eq. (2) is solved iteratively. When carrying out device simulations, the image charge effect on carrier injection is taken into account as reported in the literature. The metal electrodes are modeled as additional layers of sites, ensuring both charge injection and extraction. The total current density is $J = J^h + J^e$, with $$J^h = \frac{e}{L_x L_y L_z} \times \sum_{i,j} \{[v_{ij}^h c_i^h (1 - c_j^h) + \gamma \tilde{v}_{ij}^h (c_i^h c_j^e - c_{i0}^h c_{j0}^e)](x_j - x_i)\}, \quad (6a)$$

and $$J^e = \frac{e}{L_x L_y L_z} \times \sum_{i,j} \{[v_{ij}^e c_i^e (1 - c_j^e) + \gamma \tilde{v}_{ij}^e (c_i^e c_j^h - c_{i0}^e c_{j0}^h)](x_j - x_i)\}, \quad (6b)$$

with $L_x$, $L_y$, and $L_z$ the device dimensions in the electric field direction and the two lateral directions, respectively, and $(x_j - x_i)$ the distance between sites i and j in the direction of the electric field. In the two lateral directions, periodic boundary conditions are used. The recombination rate per unit volume on site i is given by $$R_i = \frac{\gamma}{a^3} \sum_j [\tilde{v}_{ji}^e (c_i^h c_j^e - c_{i0}^h c_{j0}^e) + \tilde{v}_{ji}^h (c_i^e c_j^h - c_{i0}^e c_{j0}^h)], \quad (7)$$

where the summation is over all nearest neighbor sites.

B. Recombination Rate Prefactor $\gamma$

In this subsection, we derive a theoretical expression for the recombination rate prefactor $\gamma$ that enters Eq. (3). Consistent with the results of KMC simulations, we require that in systems with spatially uniform and equal electron and hole concentrations, $c^h = c^e = c$, the recombination rate at low electric fields and for disorder energies $\sigma > 0.05$ eV is to a good approximation given by the Langevin formula. For the cases $c^h \neq c^e$, the theoretical derivation is less straightforward. However, it will be shown in Sec. III that for realistic device simulations, in which $c^h \neq c^e$ is common, the derived $\gamma$ in this section also works rather well. The Langevin formula can be written as:

$$R_{KMC} = \frac{e}{\varepsilon_r \varepsilon_0} 2\mu_{bip}(c) \frac{c^2}{a^6}, \quad (8)$$

where $\mu_{bip}(c) \equiv r_\mu(c)\mu(c)$ is the so-called "bipolar" mobility. The analysis thus takes into account that in bipolar systems the electron-hole Coulomb interaction leads to mobilities that are slightly enhanced, by a factor $r_\mu$, as compared to the unipolar values. When expressing the effective (site-occupation-weighted) difference between the rates of the final recombination step with and without the effects of the exciton binding energy in terms of a factor $r_v$, a comparision with Eq. (8) yields $$\gamma = \frac{e}{a^3 \varepsilon_r \varepsilon_0} r_\mu r_v \frac{2\mu c^2}{\left\langle \sum_j (v_{ij}^e c_i^h c_j^e + v_{ji}^h c_i^e c_j^h) \right\rangle_i}. \quad (9)$$

For notational simplicity, the dependence of $\gamma$, $\mu$, $r_\mu$ and $r_\nu$ on c is not explictly shown.

In the absence of energetic disorder, the occupation probabilities are at all sites equal to c, and the unipolar mobility is (for small fields) given by $\mu=a^2v_1e/(k_BT)$. Furthermore, $r_\nu=1$, because all final hops leading to recombination are barrierless, even when $E_{exc,b}=0$. From Eq. (9), the recombination prefactor is then $$\gamma = \frac{e^2}{3\varepsilon_r\varepsilon_0 ak_BT}r_\mu \text{ (no disorder)}. \quad (10)$$

Figure 10:
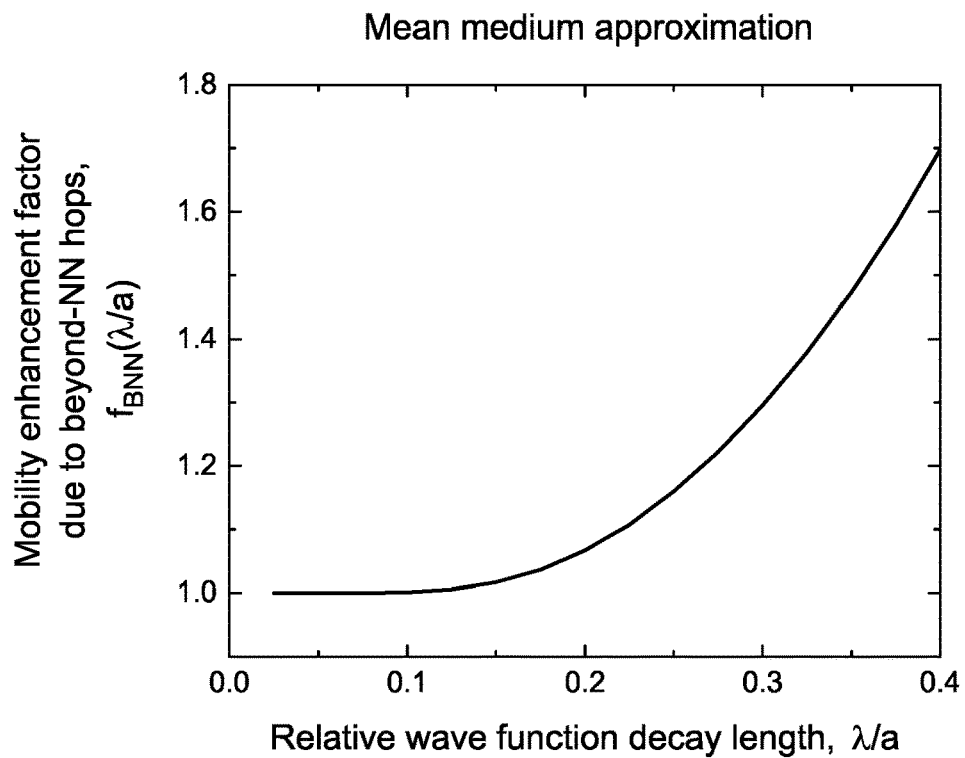
FIG. 10 shows mobility enhancement vs. wave function decay length.
Figure 11:
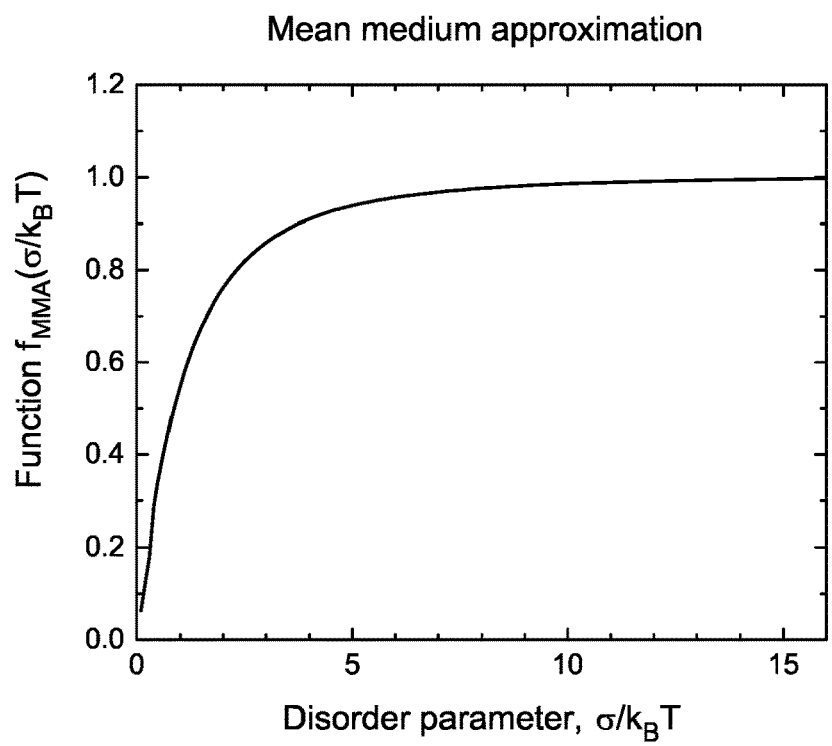
FIG. 11 shows the effect of the disorder parameter on $f_{MMA}$ as defined in the text.

For materials with Gaussian disorder, the relationship between the unipolar mobility and the nearest neighbor hop rates is less straightforward. The unipolar mobility is from the Extended Gaussian Disorder Model (EGDM) given by $$\mu(c) \cong \frac{a^2ev_1}{\sigma} \times f(\hat{\sigma}, c)_{EGDM} \times \exp[-0.42\hat{\sigma}^2], \quad (11)$$

with $f(\hat{\sigma}, c)_{EGDM}$ the carrier concentration enhancement of the mobility with respect to the mobility for small concentrations, in the independent-particle Boltzmann regime, and with $\hat{\sigma}=\sigma/(k_BT)$. The exponential factor expresses the temperature dependence of the mobility in the low-concentration limit, and includes the effects of the percolative motion of the charge carriers in the disordered material. In contrast, the denominator in Eq. (9) does not include the effects of percolation, and therefore overestimates the rate with which electron-hole encounter processes will occur. The mobility that would follow from a such a weighted summation of local hopping rates, termed the "mean medium approximation" (MMA) is for the case of nearest-neigbour hopping in a Gaussian DOS given by (see Sec. V):

$$\mu(c) \cong \frac{2\beta a^2ev_1}{\sigma} \times f(\hat{\sigma}, c)_{MMA} \times \exp[-0.25\hat{\sigma}^2], \quad (12)$$

with $\beta=0.562$ and $f(\hat{\sigma}, c)_{MMA}$ a function that in the limit of strong disorder becomes equal to the charge carrier concentration enhancement of the mobility with respect, to the mobility for small carrier concentrations (see FIGS. 10 and 11). For small disorder parameters, $f(\hat{\sigma}, c)_{MMA}$ approaches $\hat{\sigma}/2\beta$, consistent with the expression for the mobility in the disorderless limit, given above. Based on these results, we include the effect of percolation in the expression for the recombination prefactor by generalizing Eq. (10) in the following manner:

$$\gamma = \frac{e^2 r_\mu r_\nu}{3\varepsilon_r\varepsilon_0 ak_BT}\frac{\mu_{EGDM}}{\mu_{MMA}} = \frac{e^2 r_\mu r_\nu}{6\beta\varepsilon_r\varepsilon_0 ak_BT}\frac{f_{EGDM}}{f_{MMA}}\exp[-0.17\hat{\sigma}^2]. \quad (13)$$

This theoretical approach is expected to yield a useful parameterization scheme describing the disorder, temperature and carrier concentration dependence of the value of $\gamma$ that leads to optimal agreement between 3D-ME and 3D-KMC results. Based on Eq. (13), we will write $$\gamma \cong A_{th}\frac{e^2}{\varepsilon_r\varepsilon_0 ak_BT}\exp[-B_{th}\hat{\sigma}^2], \quad (14)$$

with from the theory developed above $A_{th}=r_\mu r_\nu f_{EGDM}/(6\beta f_{MMA})$ and $B_{th}\cong 0.17$. Both parameters are dimensionless.

Figure 2:
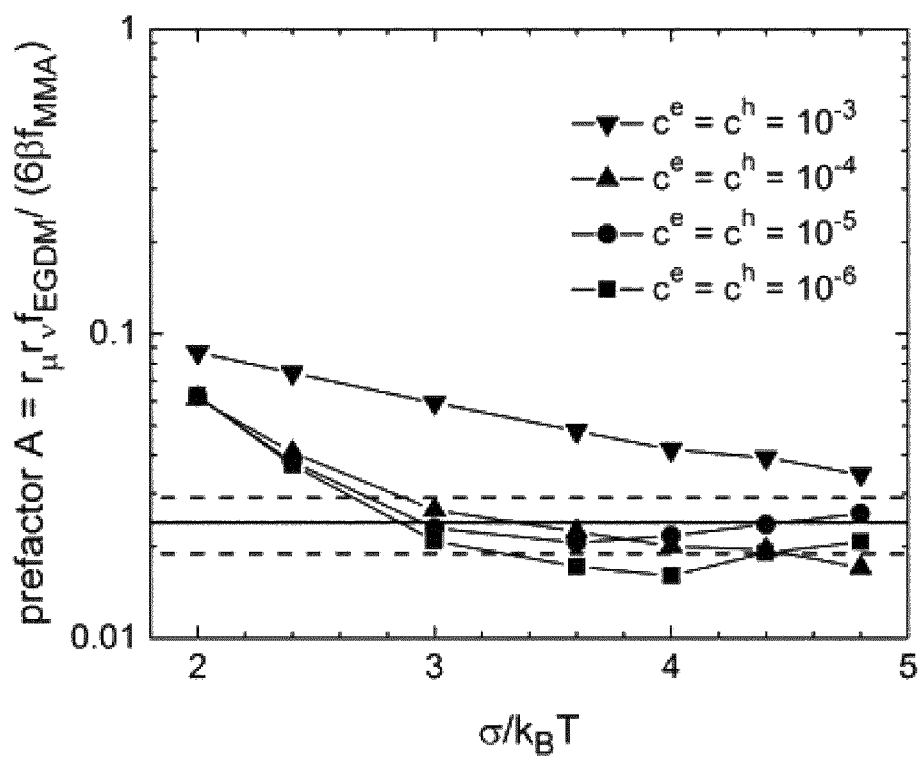
FIG. 2 shows dependence of part of the recombination rate prefactor on various parameters.
Figure 12:
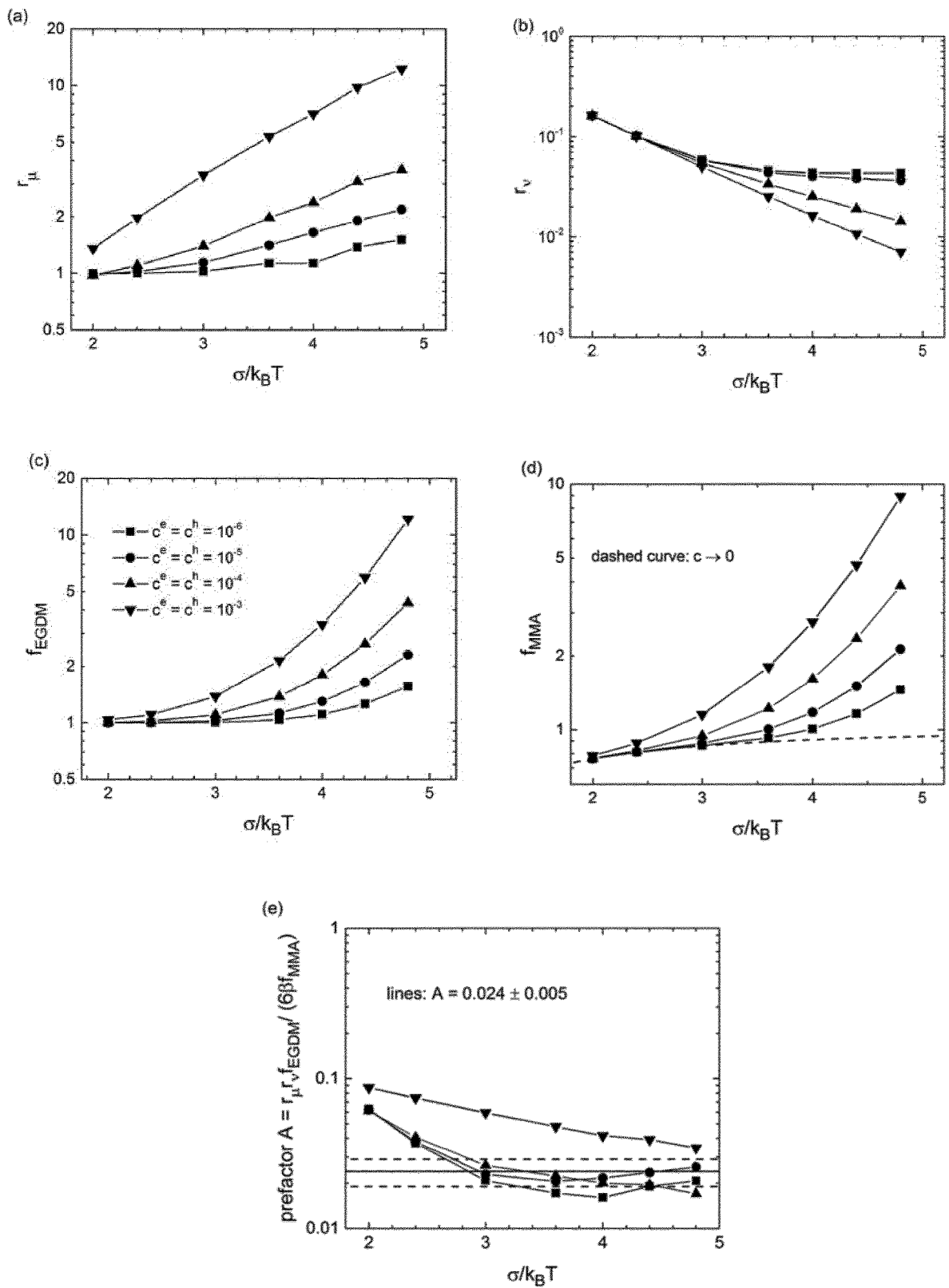
FIG. 12 shows the dependence of various components of the recombination rate prefactor on the disorder parameter.

In FIG. 2, the value of $A_{th}$ as a function of the disorder parameter $\hat{\sigma}$ and the carrier concentration c is given (details of the evaluation are given in FIG. 12). Surprisingly, although $f_{EGDM}$, $f_{MMA}$, $r_\mu$, and $r_\nu$ are all $\hat{\sigma}$ and c dependent, their combination $A_{th}$ is only weakly sensitive to $\hat{\sigma}$ and c in the range $3\leq\hat{\sigma}\leq 5$ and $10^{-6}\leq c\leq 10^{-4}$. In FIG. 12 it is shown that both $f_{EGDM}$ and $f_{MMA}$ increase with $\hat{\sigma}$ and c, and in the expression of A, they approximately cancel each other. Furthermore, $r_\mu$ increases with $\hat{\sigma}$ and c, while $r_\nu$ decreases with $\hat{\sigma}$ and c. Hence, their product in the expression of A also becomes almost $\hat{\sigma}$ and c independent, except for the case of $c=10^{-3}$. In Sec. III, we show from a comparison of 3D-ME and 3D-KMC simulation results for a large number of devices with varying materials parameters and layer thicknesses, studied for a wide application-relevant voltage and temperature range, that a satisfactory agreement is obtained when simply using a constant value $A=0.024\pm 0.005$, combined with $B\cong 0.154$. This finding significantly reduces the computational cost in 3D-ME modeling, because instead of updating $\gamma$ for all molecular sites during each iteration step, it is to a good approximation allowed to use a single value for the entire device.

In realistic devices, it is possible that the DOS of the HOMO and LUMO have different widths, i.e. $\sigma^e\neq\sigma^h$. In this case, by benchmarking the 3D-ME results with 3D-KMC, we find that using an effective $\sigma_{eff}=\min(\sigma^e, \sigma^h)$ in Eq. (14) yields a good agreement. We view this as a result of the different roles of the two carriers: the carriers on molecules with the larger $\sigma$ will be "trapped" and the recombination is most likely due to capture of the more mobile other type of carrier, on molecules with a smaller $\sigma$.

III) 3D Bipolar Device Simulations

In this section, the results of device simulations using the bipolar 3D-ME model are compared with the results of 3D-KMC simulation results. We also show simulation results for $V<V_{bi}$, where only the 3D-ME model can be used. The simulations were carried out using a constant recombination prefactor $\gamma$, of the form given by Eq. (14), and with the optimized parameters $A=0.024$ and $B=0.154$ as explained in the previous section.

Figure 3A:
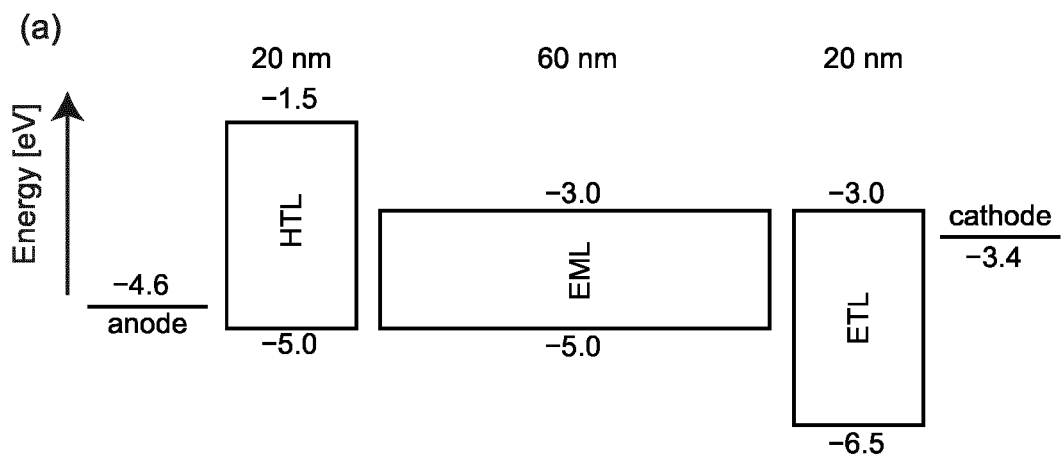
FIG. 3A show a device configuration as used in simulations.
Figure 3B:
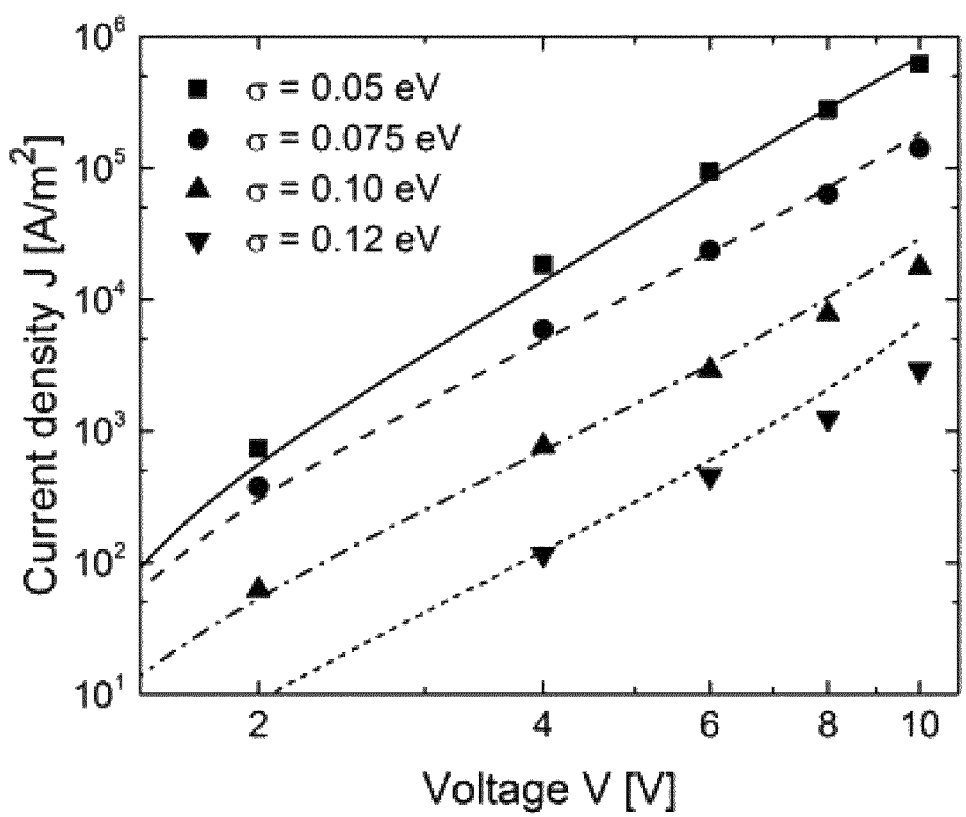
FIG. 3B shows simulation results for the configuration of FIG. 3A.

A. Current Density-Voltage Characteristics and Profiles of the Charge Carrier Concentration, Recombination Rate, and Electric Field As an example, we study 100 nm thick devices, with the layer structure shown in FIG. 3A. We assume a lattice constant $a=1$ nm, hopping attempt frequency $v_1=3.3\times 10^{10}$ $s^{-1}$, relative dielectric constant $\varepsilon_r=3$, and temperature T=290 K. The HOMO and LUMO energies are assumed to be uncorrelated. We choose a relatively large injection barrier (0.4 eV) in order to suppress the unipolar Coulomb correlation effect. This effect can in principle be included, but this is outside the scope of this work. For simplicity we take $\sigma^e=\sigma^h=\sigma$. The simulations typically include 10 disorder configurations to obtain sufficient statistics. The lateral dimensions of the devices simulated are typically 50 nm×50 nm. In realistic devices (e.g. OLEDs), a three-layer structure is commonly used, consisting of a hole transport layer (HTL), an emissive layer (EML), and an electron transport layer (ETL). In FIG. 3A, the schematic band diagram for a simple symmetric three-layer HTL(20 nm)/EML(60 nm)/ETL(20 nm) device is shown. In FIG. 3B, the simulated current density-voltage characteristics of this device for different energetic disorder $\sigma$ is plotted. The agreement between the ME (curves) and KMC (symbols) results is very good for low and moderate voltages. Deviations are observed for large voltages at large disorder.

Figure 4:
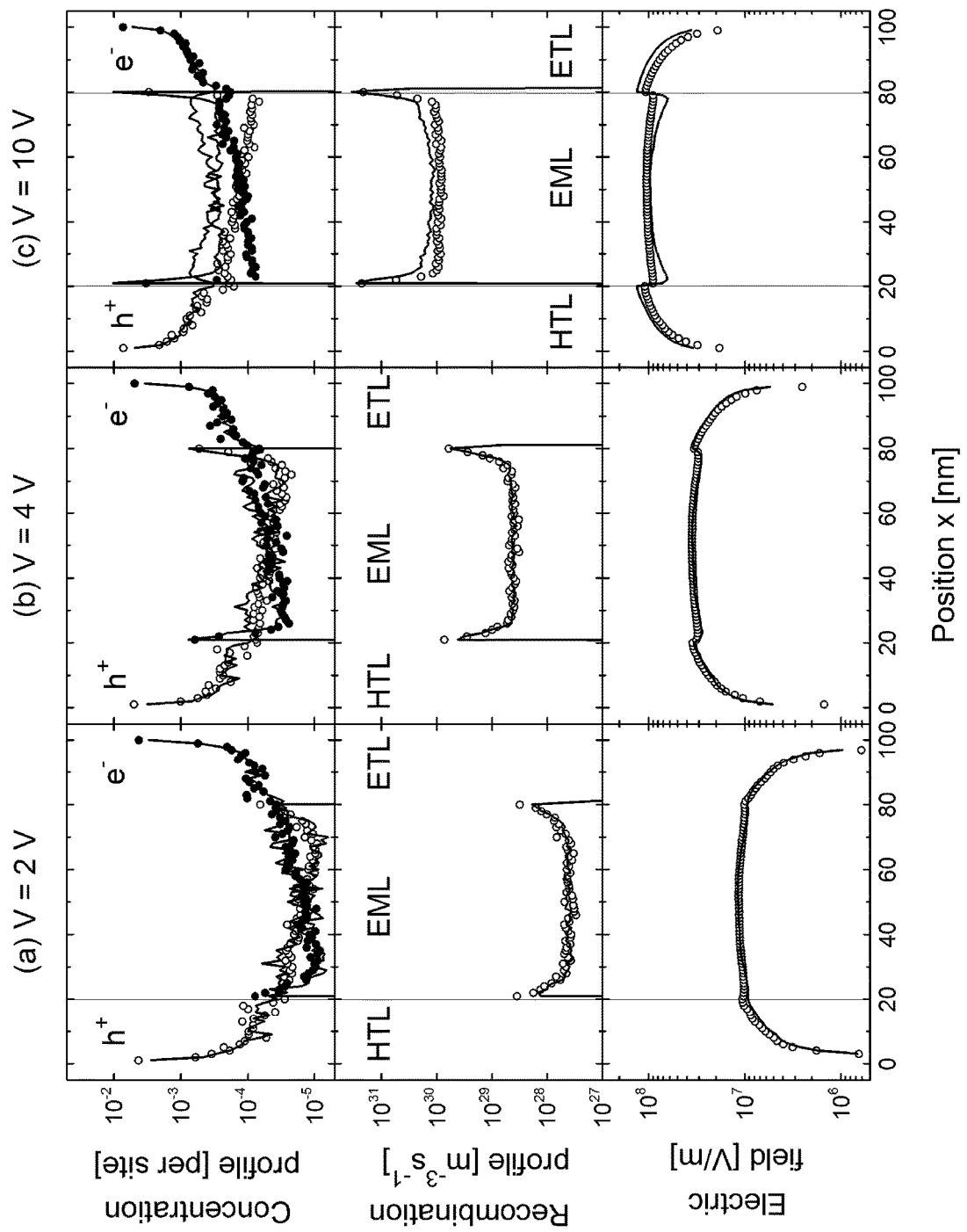
FIG. 4 shows more detailed simulation results for the configuration of FIG. 3A.

In FIG. 4, the electron and hole concentration profile, the recombination profile, and the electric field profile are shown for the device shown in FIG. 3A with σ=0.10 eV. The agreement between the 3D-ME (curves) and 3D-KMC (symbols) simulations is very good at low voltages (V=2 V and 4 V). At at large voltages (V=10 V), the 3D-ME simulations do not reproduce the 3D-KMC results well. We suspect that this is because our model for recombination (Eqs. (8)-(14)) is based on the low electric field regime, which cannot be directly applied to high electric fields (i.e. eVa/L·σ). Such high electric fields add complexity to the recombination process. The 3D-ME model in this case underestimates the local recombination rate, leading to an overestimation of the carrier concentration and current density. This is consistent with the current density-voltage simulation results in FIG. 3. We note that, at these large voltages 3D-KMC simulations are computationally as efficient or even more efficient than 3D-ME simulations. Therefore, we have not extended the 3D-ME model to include high-field cases.

To further validate the 3D bipolar ME model, we have compared the current density-voltage characteristics, charge carrier profile, and recombination profile of 3D-ME and 3D-KMC simulations for 32 additional devices. The following device parameters are varied: width of the energetic disorder (σ=0.05, 0.075, 0.10, or 0.12 eV), disorder energies for HOMO and LUMO ($\sigma^e \neq \sigma^h$, for the combination of 0.05/0.075 eV, 0.05/0.10 eV, or 0.075/0.10 eV), disorder energies σ in different layers (HTL/EML/ETL σ=0.05/0.10/0.05 eV or 0.10/0.05/0.10 eV), hopping attempt frequency of electrons and holes ($v_1^e \neq v_1^h$, e.g., $v_1^h = 10 v_1^e$ in HTL and EML), hopping attempt frequency $v_1$ in different layers ($v_1^e$ and $v_1^h$ in HTL and ETL are 10, 100, or 1000 times larger than those in EML), device thicknesses or layer thicknesses L (HTL/EML/ETL thickness=10/30/10 nm, 5/90/5 nm, 10/80/10 nm, 30/40/30 nm, or 40/20/40 nm), temperature (T=250, 320, or 387 K), injection barrier (Φ=0.2, 0.3, 0.5, or 0.6 eV), and dielectric constant ($\varepsilon_r$=4 or 6). At low voltages (V≤4 V), the 3D-ME simulation results agree in most cases well with the results from 3D-KMC simulations. There exist a few cases where deviations in the carrier concentration profiles are observed. However, in these cases the agreement in the current density-voltage characteristics and the recombination profile (which are more important for device characteristics) is still good. In addition to model validation, these simulation data sets also provide physical insight into device optimization. For example, a possible approach to obtain a uniform emission profile in the EML is to set the disorder energy σ in the EML to be larger than those in ETL and HTL.

B. Site-Resolved Charge-Carrier Concentrations and Recombination Rates

Figure 5:
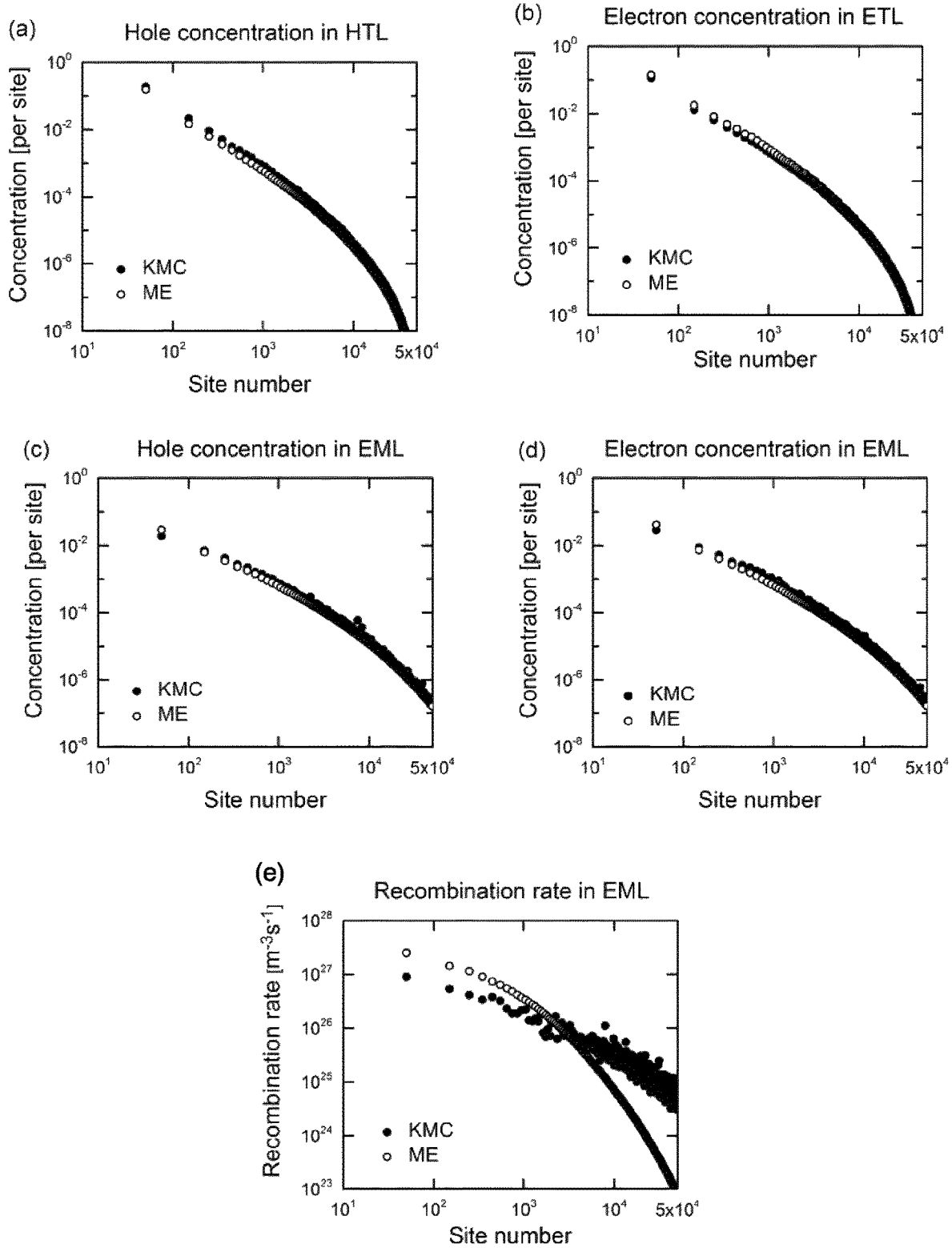
FIG. 5 shows site dependent simulation results for the configuration of FIG. 3A.

In Sec. IIIA, the 3D-ME and 3D-KMC charge carrier and recombination profiles were compared in a layer-averaged way. However, due to the energetic disorder, the charge carrier occupation probability and the recombination rate associated with each molecular site are highly inhomogeneous. A more strict test of the 3D-ME model is to compare the site-resolved concentration and recombination rates with the 3D-KMC results. In FIG. 5 parts (a) through (e), such a comparison is shown for the device in FIG. 3A with σ=0.10 eV, at V=3 V. The disorder configurations are taken to be the same for the ME and KMC simulations. In the figure, the molecular sites are labeled with a site number by descending order of carrier concentration (or recombination rate), as calculated from the 3D-ME simulations. The same site numbers are assigned to the KMC simulation results. The KMC-calculated and ME-calculated site-resolved concentrations or rates are both shown as a function of the site number. To obtain better statistics, the results are binned for every 100 sites.

The results in FIG. 5 parts (a) through (e) show that the site-resolved electron and hole concentrations calculated using the 3D-ME simulations can very well reproduce those calculated from the 3D-KMC simulations. The site-resolved recombination rates as obtained from the 3D-ME and 3D-KMC simulations are excellently correlated. However, for sites at which the recombination rates from 3D-KMC simulations is relatively large, the 3D-ME simulations overestimate the recombination rate by a factor 2-3. As the recombination rate is largest in thin zones near the EML/HTL and EML/ETL interfaces, we view this overestimation as a consequence of neglecting the carrier concentration gradients in these regions on a 2-5 nm scale. The recombination rate on sites at which in the 3D-KMC simulation recombinations seldomly take place is underestimated by the 3D-ME simulations.

Figure 6:
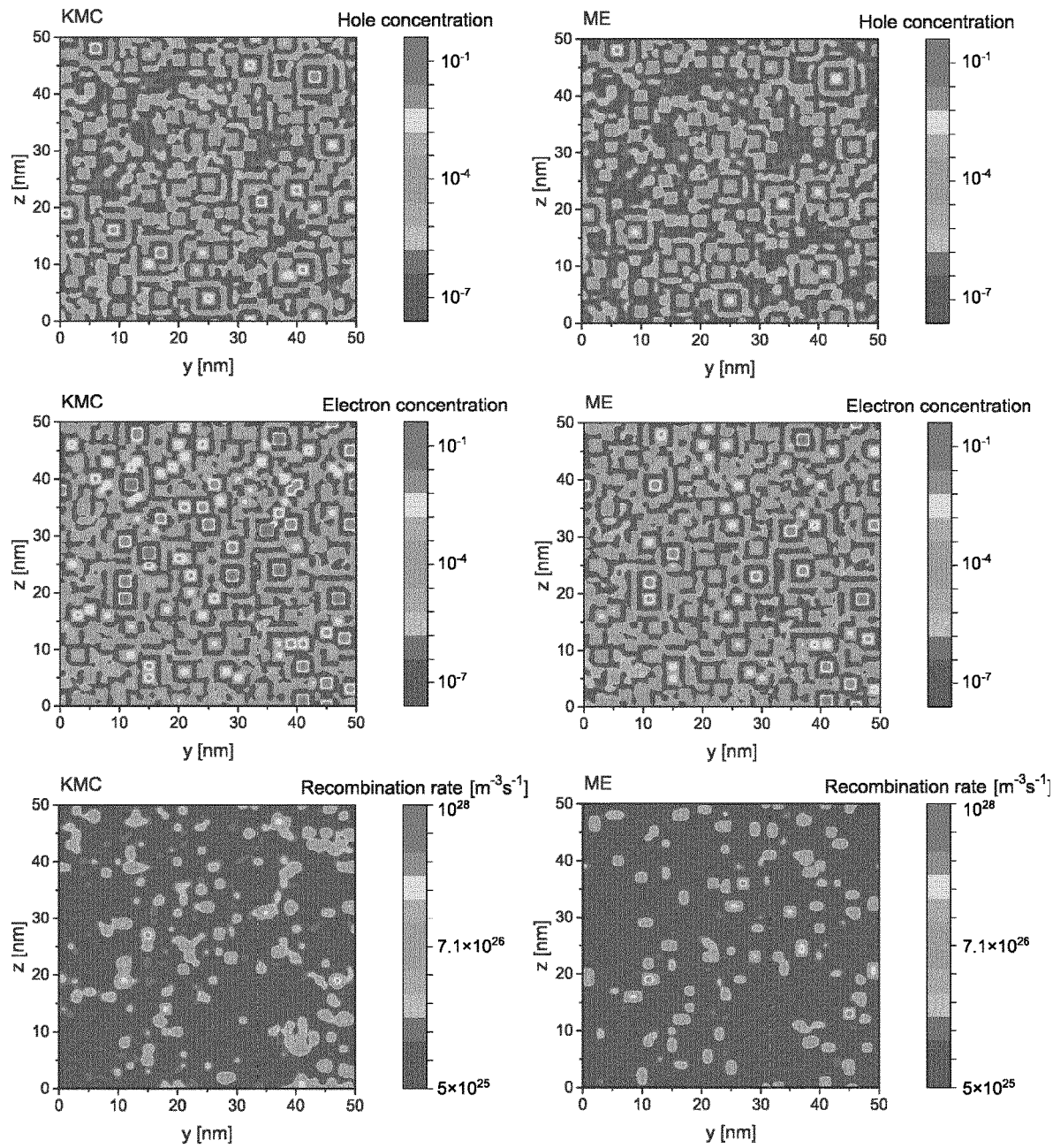
FIG. 6 shows location dependent simulation results for the configuration of FIG. 3A.

To better visualize the site-resolved results, we show in FIG. 6 cross sections of the device in FIG. 3A and plot the 2D contour profile of carrier concentration and recombination rate. The "hot spots" correspond to sites with high carrier concentrations or recombination rates. Consistent with FIG. 5, while the site-resolved carrier concentration in KMC is well-reproduced by ME, the site-resolved recombination rate shows some differences. The results of FIG. 6 are from the layer at x=21 nm (the layer in the EML that is adjacent to the EML/HTL interface). The left panels are 3D-KMC results and the right panels are 3D-ME results. A color version of FIG. 6 can be found in Liu et al., ("Three-Dimensional Modeling of Bipolar Charge-Carrier Transport and Recombination in Disordered Organic Semiconductor Devices at Low Voltages", Phys. Rev. Applied, vol. 10, 2018, 054007).

C. "Local" Versus "Nearest-Neighbor" Descriptions of Recombination

Figure 7:
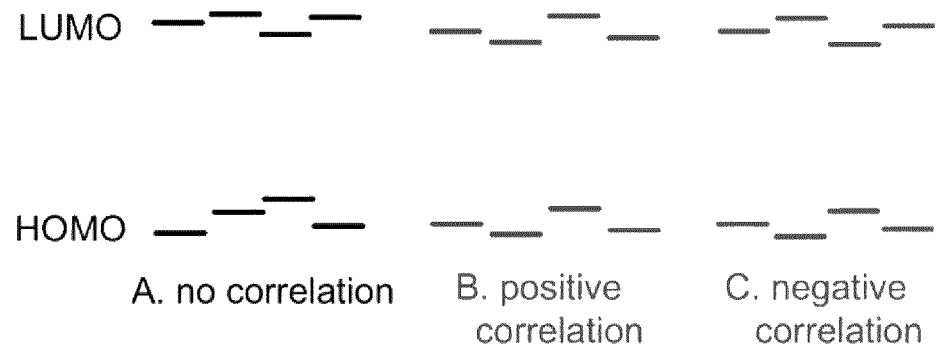
FIG. 7 is a comparison between local and non-local modeling of recombination.
Figure 7:
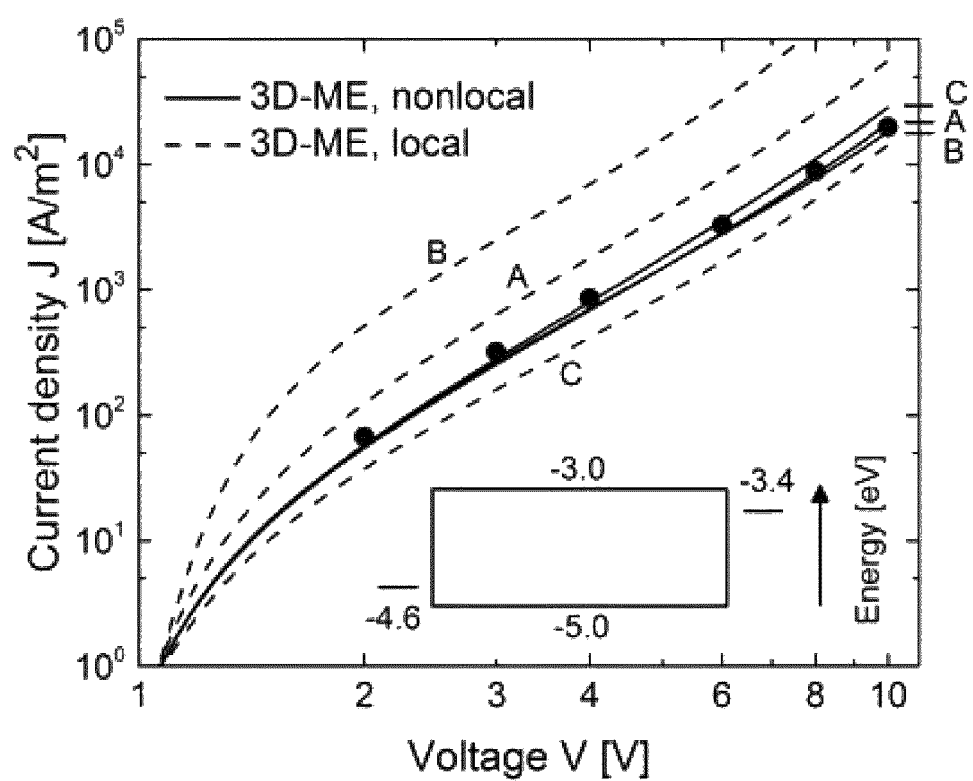

In Eq. (4), recombination has been described as a "nearest-neighbor" process, instead of a "local" process with a rate at site i proportional to $c_i^h c_i^e$. In order to compare the effect of these two alternative approaches, we compare the results of 3D-ME and 3D-KMC simulations for a 100 nm single-layer device with a symmetric energy level structure as shown in the inset of FIG. 7 for the case of positive, negative and vanishing correlation between the HOMO and LUMO energies (see the top part of FIG. 7). As was shown in the literature, both types of disorder can be found in actual materials: electrostatic fields give rise to a positive correlation and configurational disorder can give rise to negative correlation. A robust model should be valid for all cases. FIG. 7 shows that KMC simulations reveal that the type of correlation has no significant effect on the device current density. This is because the main driving force for the last step of recombination is the exciton binding energy, which is much larger than the energetic disorder σ. This result is well reproduced by the "percolation-corrected nearest-neighbor" ME model proposed in this work (full curves in the figure). In contrast, using a "local" ME model would give rise to strongly deviating results (dashed curves).

D. Current-Voltage Characteristics Below the Built-In Voltage

To further investigate the validity of the bipolar 3D-ME simulation model, we examine the current density-voltage characteristics around and below the built-in voltage $V_{bi}$. In this regime, the current density is dominated by diffusion rather than drift. The current increases exponentially with voltage. KMC simulations are then not realistically applicable due to an impractically long simulation time (FIGS. 1A-B). In this subsection, we study the dependence of the ideality factor $\eta$, which is defined as $\eta=[k_B T/e \cdot d(\ln J)/dV]^{-1}$, on the disorder energy, voltage and temperature. The 3D-ME simulation results are shown in FIGS. 8 and 9.

The ideality factor, obtained from the slope of the current density-voltage characteristics, enters the generalized Einstein relation between the diffusivity D and the mobility $\mu$, $D=\eta\mu k_B T/e$. For nondegenerate inorganic semiconductors, $\eta=1$. For disordered organic semiconductors, with a Gaussian DOS, $\eta>1$ when the DOS is filled above the critical concentration beyond which the system is not anymore in the independent-particle (Boltzmann) regime. The ideality factor $\eta$ is a function of the disorder parameter $\hat{\sigma}$ and the carrier concentration c. In a device, the carrier concentration profile is not uniform. That implies that the ideality factor as deduced from experiments can depend on the voltage at which it has been determined, as will be shown below.

It is not straightforward to directly compare the simulated ideality factor with the experimentally measured ideality factor in literature. The difference might come from three reasons. (a) In our simulations we consider a Gaussian DOS, but in reality there might be a superimposed exponential trap DOS, which is not included in our model. The exponential trap DOS will significantly modify the ideality factor. (b) As the ideality factor is extracted from the slope of the current density-voltage characteristics, the choice of voltage point affects the extracted ideality factor (see above). (c) In reality, there is usually a leakage current in the low voltage regime which is not included in the simulation. The leakage current is expected to influence the ideality factor. Hence, one needs to be careful regarding the physical interpretation of the ideality factor.

Figure 8:
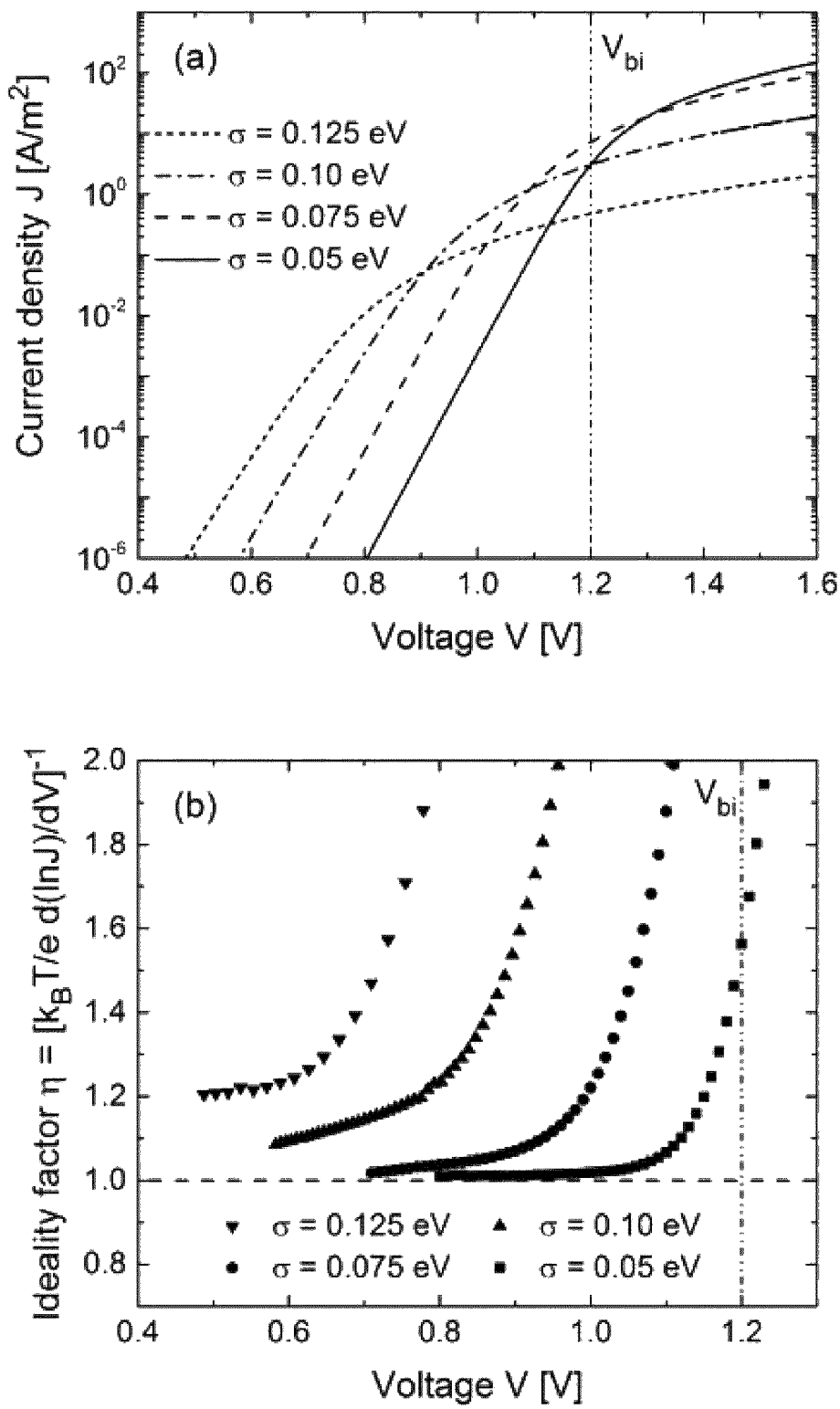
FIG. 8 shows dependence of simulated J-V curves on disorder energy.
Figure 9:
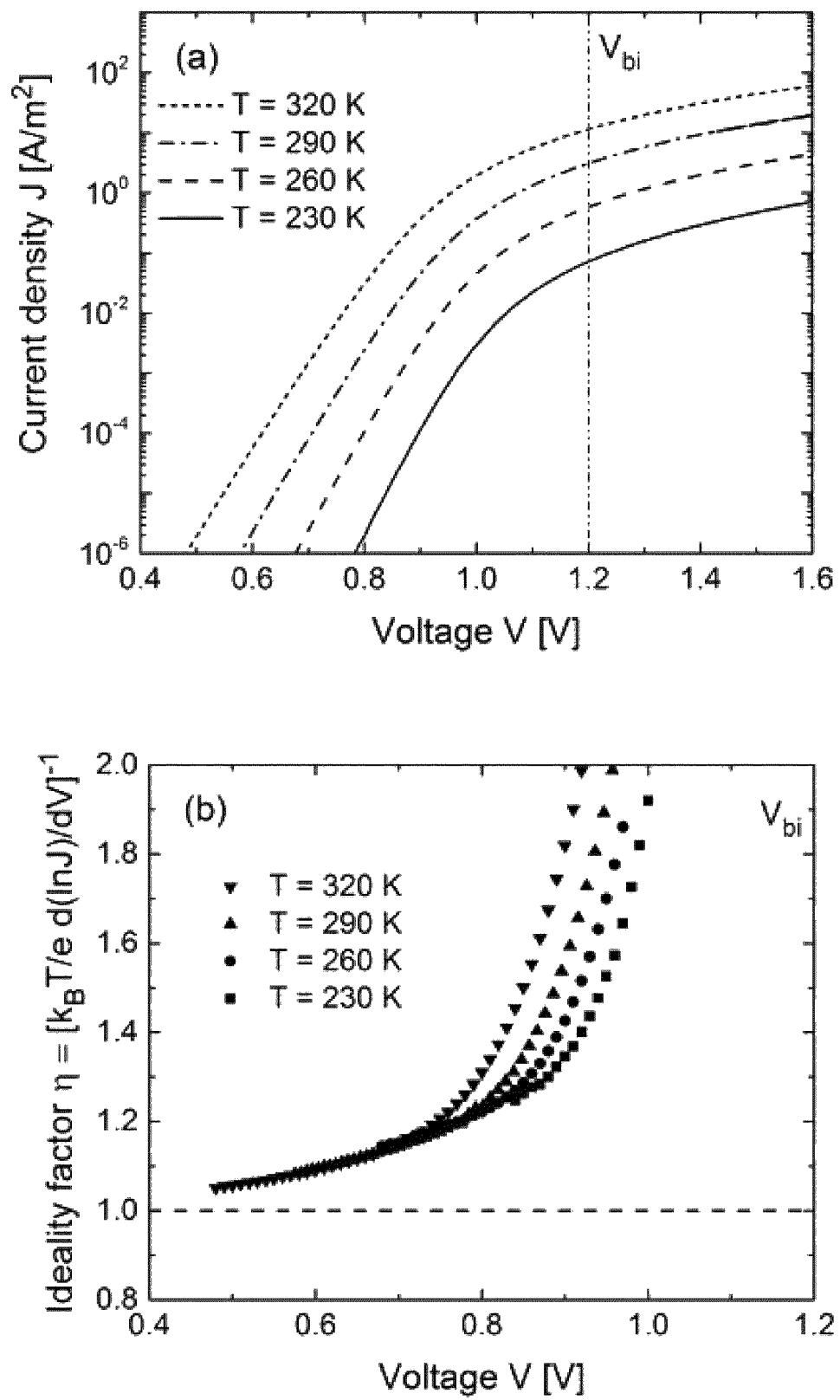
FIG. 9 show dependence of simulated J-V curves on temperature.

In FIG. 8, the disorder energy $\sigma$ is varied while the temperature T is fixed at 290 K. FIG. 8 part (a) shows that for large $\sigma$ and low voltages, the current density is larger than that for the small $\sigma$ case. This is, at least in part, due to the easier injection from the electrodes into a wider DOS. FIG. 8 part (I)) shows that the ideality factor is indeed voltage dependent. For small $\sigma$ and low voltages, the ideality factor approaches unity. In the voltage range studied, it increases with $\sigma$. This effect can be explained from the increasing charge carrier concentration, at any point in the device, with increasing $\sigma$, combined with the increase with $\sigma$ of the diffusion coefficient enhancement factor at any given carrier concentration.

In FIG. 9, the disorder energy $\sigma$ is fixed at 0.10 eV while the temperature T is varied. We observe that the ideality factor is almost independent of temperature, which agrees with experimental results. We also find that for a series of symmetric 100 nm devices with varying EML layer thicknesses the ideality factor, evaluated at a fixed low voltage, is not significantly dependent on the voltage. We remark that accurate calculation of the ideality factor requires high precision in the current density-voltage calculation. To run the 3D-ME simulations with a sufficiently high precision for a current density as low as $10^{-6}$ A/m², the simulation time is significantly larger than those shown in FIGS. 1A-B.

IV) Conclusions and Outlook

In this work, we have presented a bipolar 3D-ME simulation model that can be used to predictively model electron-hole recombination in disordered organic semiconductor devices at low voltages. For voltages close to or smaller than the built-in voltage $V_{bi}$, the simulation method is numerically much more efficient than 3D-KMC simulations. The model has been validated by comparing the simulation results for a wide range of parameters with those obtained from 3D-KMC simulations. From the development of a theoretical expression for the recombination prefactor $\gamma$ (Eq. (13)), we have gained deepened understanding of the factors that determine the recombination rate in disordered organic semiconductors.

The bipolar 3D-ME model presented in this work opens up a route towards strongly accelerated OLED device simulations. It can be further extended and improved in various ways. In this work, the simulations are limited to organic semiconductors with a Gaussian DOS. It is important in future to extend the model beyond a Gaussian DOS, because in practice (a) the emissive layers are composed of a host-guest system, and (b) in some materials an exponential DOS of traps is present. We envisage that the methodology for including recombination, developed in Section II.B for the case of a Gaussian DOS and based on a comparison of percolation and mean-field based transport theories, can be extended to other types of the density of states. No calibration using KMC simulations would then be needed. It is also important to extend the model to include excitonics (e.g. exciton diffusion, recombination, annihilation, quenching, intersystem crossing, and etc.), which is crucial for OLED simulations. However, while in 3D-KMC simulations these processes could be added straightforwardly, in 3D-ME simulations the inclusion of these processes requires deeper insight into the device physics.

V) Supplemental Information—Charge-Carrier Recombination in the 3D-ME Simulation Model In this section, we present a full theoretical description of charge-carrier recombination in the 3D-ME simulation model, including a detailed derivation and numerical evaluation of the recombination prefactor $\gamma$ that enters Eq. (3) in the main text.

A. Theoretical Expression for the Recombination Prefactor $\gamma$

In the bipolar 3D-ME model, the time-dependence of the hole and electron concentrations at a site i, $c_i^h$ and $c_i^e$, respectively, is described as follows:

$$\frac{dc_i^h}{dt} = \sum_j [\nu_{ji}^h c_j^h(1-c_i^h) - \nu_{ij}^h c_i^h(1-c_j^h) - \gamma(\tilde{\nu}_{ji}^e + \tilde{\nu}_{ij}^e)(c_i^h c_j^e - c_{i0}^h c_{j0}^e)], \quad \text{(S1a)}$$

$$\frac{dc_i^e}{dt} = \sum_j [\nu_{ji}^e c_j^e(1-c_i^e) - \nu_{ij}^e c_i^e(1-c_j^e) - \gamma(\tilde{\nu}_{ji}^h + \tilde{\nu}_{ij}^h)(c_i^e c_j^h - c_{i0}^e c_{j0}^h)], \quad \text{(S1b)}$$

$$\nu_{ij}^{h(e)} = \nu_1^{h(e)} \times \begin{cases} e^{-\Delta E_{ij}^{h(e)}/(k_B T)}, & \Delta E_{ij}^{h(e)} > 0, \\ 1, & \Delta E_{ij}^{h(e)} \leq 0, \end{cases} \quad \text{(S1c)}$$

$$\tilde{\nu}_{ij}^{h(e)} = \nu_1^{h(e)} \times \begin{cases} e^{-\Delta \tilde{E}_{ij}^{h(e)}/(k_B T)}, & \Delta \tilde{E}_{ij}^{h(e)} > 0, \\ 1, & \Delta \tilde{E}_{ij}^{h(e)} \leq 0, \end{cases} \quad \text{(S1d)}$$

$$\Delta \tilde{E}_{ij}^{h(e)} = \Delta E_{ij}^{h(e)} - E_{exc,b}. \quad \text{(S1e)}$$

See also Eqs. (2)-(5) and the definitions of all quantities above. The recombination rate at site i is a result of electrons hopping from site j to i (if there is a hole on site i) and holes hopping from site j to i (if there is an electron on site i). These local rates are modified (in general enhanced) by the effect of the exciton binding energy. We note that the net effect of this enhancement on the recombination rate is only moderate, because the local and neighboring electron and hole densities will be reduced when increasing the local rates by increasing the binding energy, providing (in part) a compensating effect. Neglecting a small intrinsic (thermal-equilibrium) carrier concentration, the local recombination rate is from Eq. (7) above given by $$R_i = \frac{\gamma}{a^3} \sum_{sites\ j} (\tilde{v}_{ji}^e c_i^h c_j^e + \tilde{v}_{ji}^h c_i^e c_j^h), \quad (S2)$$

where the summation is over all nearest-neighbor (NN) sites. This expression has the general form of the Langevin formula, which for a system with equal electron and hole concentrations, and a constant and equal electron and hole mobility µ reads $$R_{Langevin} = \frac{e}{\varepsilon_r \varepsilon_0} 2\mu \frac{c^2}{a^6}, \quad (S3)$$

$\varepsilon_r$ is the relative dielectric constant and $\varepsilon_0$ is the vacuum permittivity. In the absence of energetic disorder, the unipolar mobility (for small fields) on a simple cubic lattice is given by $$\mu = \frac{a^2 v_1 e}{k_B T}, \quad (S4)$$

so that the Langevin recombination rate is then equal to $$R_{Langevin} = \frac{2e^2}{\varepsilon_r \varepsilon_0 k_B T a^4} v_1 c^2, \quad (S5)$$

From a comparison between Eqs. (S2) and (S5), and neglecting the effect of the exciton binding energy on the local hop rates, one would then expect that $$\gamma = \frac{e^2}{3\varepsilon_r \varepsilon_0 a k_B T}. \quad (S6)$$

For energetically disordered systems, this derivation of γ is for various reasons an oversimplification. Firstly, from a Kinetic Monte Carlo (KMC) study by van der Hoist et al. it is known that for the case of equal electron and hole densities, the recombination rate is given by the Langevin formula, but modified by a factor $r_\mu(c, \hat{\sigma})$ (≥1), due to the need to include Coulomb-correlation effects ("bimolecular mobilities"). In part C of this section (FIG. 12 part (a)), we show from KMC simulations how $r_\mu$ varies with the carrier concentration and with the reduced disorder parameter $\hat{\sigma}=\sigma/(k_B T)$. Secondly, we have to include in γ a correction for describing the recombination rate in Eq. (S2) using a NN hop rate that is enhanced by including the exciton binding energy. Whereas that is physically correct when the final exciton-formation step is considered, the mobility of the recombining charges at distances larger than a NN-distance due to hops before the final recombination step is then taken to be too large. We correct for this error by including in γ a factor $r_v(c, \hat{\sigma})$ (≤1) that is equal to the inverse of the average rate enhancement for a system with a uniform carrier concentration:

$$r_v = \frac{\left\langle \sum_j (v_{ji}^e c_i^h c_j^e + v_{ji}^h c_i^e c_j^h) \right\rangle_i}{\left\langle \sum_j (\tilde{v}_{ji}^e c_i^h c_j^e + \tilde{v}_{ji}^h c_i^e c_j^h) \right\rangle_i}. \quad (S7)$$

In part C of this section (FIG. 12 part (b)), we show from KMC simulations how $r_v$ varies with the carrier concentration and with the disorder parameter. Thirdly, we have to correct γ by properly including the percolative nature of the mobility of the recombining charge carriers. From the Extended Gaussian Disorder Model (EGDM), the unipolar mobility for materials with Gaussian disorder is at small electric fields given by $$\mu(\hat{\sigma}, c)_{EGDM} \simeq \frac{a^2 e v_1}{\sigma} \times f(\hat{\sigma}, c)_{EGDM} \times \exp(-0.42\hat{\sigma}^2), \quad (S8)$$

with $f(\hat{\sigma}, c)_{EGDM}$ the carrier concentration enhancement of the mobility with respect to the mobility for small concentrations, in the independent-particle Boltzmann regime:

$$f_{EGDM} \simeq \frac{1}{c} \exp\left( \frac{\eta}{k_B T} + \frac{\hat{\sigma}^2}{2} \right). \quad (S9)$$

The percolative motion of the charge carriers gives rise to a strong dependence of the mobility on the disorder parameter $\hat{\sigma}$. In contrast, the NN-approach as used in Eq. (S2) neglects the percolative motion of the recombining charge carriers. The mobility of the recombining charge carriers is then overestimated, and expected to be given by the value obtained from the Mean Medium Approximation (MMA). In part B of this section, we show that the mobility for NN hopping in a Gaussian DOS is then $$\mu(\hat{\sigma}, c)_{MMA} \simeq \frac{2\beta a^2 e v_1}{\sigma} \times f(\hat{\sigma}, c)_{MMA} \times \exp(-0.25\hat{\sigma}^2), \quad (S10)$$

with β=0.562 and $f(\hat{\sigma}, c)_{MMA}$ the carrier concentration enhancement of the mobility with respect to the mobility for small concentrations, in the independent-particle Boltzmann regime, given by Eq. (S18) in subsection B. Within the MMA, the disorder parameter dependence of the mobility is thus significantly smaller than within the EGDM.

Combination of these three corrections leads to the following final expression for the recombination prefactor γ:

$$\gamma = \frac{r_\mu r_v f_{EGDM}}{6\beta f_{MMA}} \frac{e^2}{\varepsilon_r \varepsilon_0 a k_B T} \exp(-0.17\hat{\sigma}^2). \quad (S11)$$

B. Unipolar Carrier Transport in the Mean Medium Approximation for a Gaussian DOS As motivated in part A of this section, we derive here an expression for the mobility within the MMA. Within the MMA, the current density is proportional to the sum of contributions of all possible hops between pairs of sites, with a weight that is equal to the product of the resulting displacement in the field direction and the hopping rate.

With the Miller-Abrahams model for the hopping rate, the MMA on a discrete lattice leads to the following expression for the current density J:

$$J_{MMA} = \qquad (S12)$$
$$ev_1 a^3 N_t^2 \sum_{sites\ k} z_k \exp(-2R_k/\lambda) \int_{-\infty}^{+\infty} dE_i \int_{-\infty}^{+\infty} dE_j g(E_i) g(E_j) f(E_i, \eta) \times [$$
$$1 - f(E_j, \eta)] \exp\left(-\frac{E_j - E_i - ez_k F + |E_j - E_i - ez_k F|}{2 k_B T}\right).$$

Here $N_t$ is the molecular site density, $R_k$ is the distance between the initial and final sites during one hopping event, $z_k$ is the hopping distance along the direction of the electric field F, g(E) is the density of states (DOS), f is the Fermi-Dirac distribution function, $\eta$ is the Fermi energy, and the definitions of all other quantities are the same as those in the main text. In the limit of F→0, the current density becomes $$J_{MMA} = ev_1 a^3 N_t^2 \frac{eF}{k_B T}\left[\sum_{sites\ k} z_k^2 \exp(-2R_k/\lambda)\right] \times \qquad (S13)$$

$$\int_{-\infty}^{+\infty} dE_i \int_{E_i}^{+\infty} dE_j g(E_i) g(E_j) f(E_i, \eta)[1 - f(E_j, \eta)] \exp\left(-\frac{E_j - E_i}{k_B T}\right), \qquad (S14)$$

and the charge-carrier mobility becomes $$\mu_{MMA} \equiv \frac{J_{MMA}}{neF} = v_1 \left[\sum_{sites\ k} z_k^2 \exp(-2R_k/\lambda)\right] \frac{e}{k_B T} \times \qquad (S15)$$

$$\frac{\int_{-\infty}^{+\infty} dE_i \int_{E_i}^{+\infty} dE_j g(E_i) g(E_j) f(E_i, \eta)[1 - f(E_j, \eta)] \exp\left(-\frac{E_j - E_i}{k_B T}\right)}{\int_{-\infty}^{+\infty} dE g(E) f(E, \eta)} = v_1 a^2 2 \exp(-2a/\lambda)$$

$$f_{BNN}(\lambda/a) \frac{e}{k_B T} \times \frac{\int_{-\infty}^{+\infty} dE_i \int_{E_i}^{+\infty} dE_j g(E_i) g(E_j) f(E_i, \eta)[1 - f(E_j, \eta)] \exp\left(-\frac{E_j - E_i}{k_B T}\right)}{\int_{-\infty}^{+\infty} dE g(E) f(E, \eta)},$$

where the function $f_{BNN}$, shown in FIG. 10, gives the mobility enhancement when including beyond-nearest-neighbor hops. The enhancement depends only on the wave function decay length, expressed in units of a:

$$f_{BNN}(\lambda/a) \equiv \frac{\sum_{sites\ k} \left(\frac{z_k}{a}\right)^2 \exp(-2R_k/\lambda)}{2\exp(-2a/\lambda)}. \qquad (S16)$$

This result is valid for any shape of the DOS.

For the case of a Gaussian DOS with a width (standard deviation) σ, the mobility is given by:

$$\mu_{MMA} \equiv \frac{v_1 e a^2}{\sigma} 2\exp(-2a/\lambda) \times \beta \times \qquad (S17)$$
$$\exp\left[-\frac{1}{4}\left(\frac{\sigma}{k_B T}\right)^2\right] \times f_{BNN}(\lambda/a) \times f_{MMA}(\sigma/k_B T, \eta/\sigma),$$

with β=0.562 (determined numerically for the limit of a large disorder parameter σ/$k_B$T) and with $f_{MMA}$ a dimensionless function of the disorder parameter and the Fermi energy $\eta$ that gives the variation of the mobility with increasing carrier concentration:

$$f_{MMA}\left(\frac{\sigma}{k_B T}, \frac{\eta}{\sigma}\right) \equiv \frac{\frac{\sigma}{k_B T} \times \int_{-\infty}^{+\infty} dE_i \int_{E_i}^{+\infty} dE_j g(E_i) g(E_j) f(E_i, \eta)[1 - f(E_j, \eta)] \exp\left(-\frac{E_j - E_i}{k_B T}\right)}{\int_{-\infty}^{+\infty} dE g(E) f(E, \eta) \cdot \beta \times \exp\left[-\frac{1}{4}\left(\frac{\sigma}{k_B T}\right)^2\right]}. \qquad (S18)$$

The constant β has been chosen such that $f_{MMA}$ is equal to 1 in the limit of a very large disorder parameter and a very small charge concentration (deep in the Boltzmann regime). FIG. 11 shows $f_{MMA}$ as a function of the disorder parameter, in the zero-concentration limit. Eq. (S18), combined with FIG. 11, show that for strong disorder, $\ln(\mu_{MMA})$ varies to a good approximation linearly with to $[\sigma/(k_B T)]^2$, with a slope equal to −¼.

Typically, $\lambda/a$ for small molecules is assumed to be in the 0.1-0.3 range. As we focus in this work on transport due to NN-hops, the mobility enhancement factor $f_{BNN}$ does not enter our final expression for γ, Eq. (S11). Extending the model to include this effect would also require providing an analogous analysis of the mobility enhancement as a function of $\lambda/a$ from full 3D-ME or KMC simulations of the mobility.

C. Numerical Evaluation of γ

We see from Eq. (S11) that γ is a complex function of the carrier concentration and the disorder parameter. In this section, we provide a numerical evaluation of this dependence. The analysis suggests that within a fairly wide range of parameter values, γ can be written in the form $$\gamma \cong A \frac{e^2}{\varepsilon_r \varepsilon_0 a k_B T} \exp(-B\hat{\sigma}^2), \qquad (S19)$$

where A and B are independent of c and $\hat{\sigma}$. The finding that γ can be approximated as a constant significantly reduces the computational complexity of 3D-ME modeling. Giving a full numerical evaluation of γ, for all possible situations, is in practice unfeasible, because $r_\mu$ and $r_\nu$ depend on the electron as well as the hole concentrations. For simplicity, we only show here the results of numerical evaluations for the case of $c^h = c^e$. In the next section, we show by direct comparisons of results from ME and KMC simulations that the conclusions from this section are also well-applicable when the electron and hole concentrations are different.

In FIG. 12 parts (a)-(d), $r_\mu$, and $r_\nu$, $f_{EGDM}$, and $f_{MMA}$, respectively, are given as a function of $\hat{\sigma} = \sigma/k_B T$. For evaluating $r_\mu$, we run KMC simulations for periodic boundary boxes. A relatively low electric field, $F = 10^7$ V/m, is applied. For unipolar cases, the mobility $\mu_{uni}$ is calculated by filling the box with the desired concentration of a single type of charge carrier. For bipolar cases, the mobility $\mu_{bi}$ is calculated by filling the box at random sites by the desired concentration of both types of charge carriers. The 3D Coulomb interaction between all charge carriers is explicitly considered. Subsequently, we evaluate $r_\mu \equiv \mu_{bi}/\mu_{uni}$. The function $r_\nu(c, \hat{\sigma})$, defined in Eq. (S7), is evaluated using 3D-ME simulations for a box with periodic boundary conditions, randomly filled with non-interacting electrons and holes (each according to a Fermi-Dirac distribution corresponding to the carrier concentration of interest). The functions $f_{EGDM}$ and $f_{MMA}$ are calculated from Eqs (S9) and (S18), respectively. The overall effect of these factors on the parameter $A_{th} \equiv r_\mu r_\nu f_{EGDM}/(6\beta f_{MMA})$ is shown in FIG. 12 part (e). It is seen that for $3 \leq \hat{\sigma} \leq 5$ and $c < 10^{-3}$, $A_{th}$ depends only weakly on $\hat{\sigma}$ and c.

We have extensively studied whether it would be admitted to use a single value of the A parameter for a large number of devices and experimental conditions of practical relevance, and we have found that that is to a good approximation indeed possible when using $A \cong (0.024 \pm 0.005)$, when combined with $B \approx -0.154$. Therefore, in the main text, we use the following simplified form of the γ formula in the 3D-ME simulations:

$$\gamma = (0.024 \pm 0.005) \frac{e^2}{\varepsilon_r \varepsilon_0 a k_B T} \exp(-0.154 \hat{\sigma}^2). \quad (S20)$$

The invention claimed is:

1. A computer implemented method of simulating operation of a semiconductor, the method comprising:
    (a) receiving an input specification of composition and geometry of the semiconductor;
    (b) performing a master equation simulation of and/or charge recombination based on the input specification;
    (c) wherein charge transport is modeled as transport of charged species between states within the semiconductor;
    (d) wherein recombination is modeled as a non-local process where a charge at a first location and a charge at a second location can recombine;
    (e) wherein a rate of the recombination is modeled as a product of a prefactor γ, hopping rates and state occupancies;
    (f) wherein the prefactor γ is calculated using parameters of the semiconductor including one or more of the following: a temperature, a relative dielectric permittivity, and a disorder energy; and
    (g) providing simulated transport results of the semiconductor as an output.

2. The method of claim 1, wherein the master equation simulation is performed for one or more applied voltages less than or equal to a built-in voltage of the semiconductor.

3. The method of claim 1, wherein the semiconductor is an organic semiconductor.

4. The method of claim 1, wherein the semiconductor is configured as a device is selected from the group consisting of: light emitting diodes, solar cells, photodetectors, photovoltaic energy conversion devices, and light emitting field effect transistors.

5. The method of claim 1, wherein a geometry of the input specification is selected from the group consisting of: single layer structures, two layer structures, three layer structures, multi-layer structures, 1D device geometries, 2D device geometries, and 3D device geometries.

6. The method of claim 1, wherein composition parameters of the input specification are selected from the group consisting of: mean energy of a density of states and energy width of a density of states.

7. The method of claim 1, wherein the simulated transport results are selected from the group consisting of: current density, position-dependent current density, electron concentration, hole concentration, current-voltage relations, position-dependent recombination rate, light emission(voltage) relations, voltage(light absorption) relations, light emission(current density) relations and current density(light absorption) relations.

8. The method of claim 1, wherein the input specification is a multi-layer structure, wherein the semiconductor is an organic light emitting diode, wherein a first layer is a metal cathode, wherein a second layer is an organic semiconductor electron transport layer (ETL), wherein a third layer is an organic semiconductor emissive layer (EML), wherein a fourth layer is an organic semiconductor hole transport layer (HTL), wherein a fifth layer is an indium tin oxide layer and wherein a sixth layer is a glass substrate.

9. The method of claim 8, further comprising automatic optimization of at least thicknesses of the ETL, EML and HTL to maximize light output.

10. A method of automatic and systematic design of a semiconductor, the method comprising:
    (a) receiving a partial input specification of composition and geometry of the semiconductor;
    (b) defining a simulation space of device parameters and corresponding parameter ranges of the semiconductor;
    (c) automatically performing the method of claim 1 for two or more different cases, wherein the input specification is determined for each case by selecting values for each of the device parameters within the corresponding parameter ranges; and
    (d) providing an optimized device configuration as an output.

11. The method of claim 1, wherein the charged species are electrons and holes.

12. The method of claim 1, wherein the master equation simulation is a 3D master equation simulation.

13. The method of claim 1, wherein the semiconductor is a disordered semiconductor and wherein the charge transport is modeled as incoherent hopping between localized molecular states.

14. The method of claim 13, wherein the first location and the second location are nearest neighbors in a set of the localized molecular states.

15. The method of claim 1, wherein the prefactor γ is given by an empirically derived analytic expression.

16. The method of claim 15, wherein e is electron charge, wherein $\varepsilon_0$ is the dielectric permittivity of free space, wherein $\varepsilon_r$ is the relative dielectric permittivity of the organic semiconductor, wherein a is a lattice constant of the semiconductor, wherein $k_B$ is Boltzmann's constant, wherein T is temperature, and wherein $\sigma$ is an energy width of a Gaussian density of states of the semiconductor; and wherein the empirically derived analytic expression is given by $$\gamma \cong A \frac{e^2}{\varepsilon_r \varepsilon_0 a k_B T} \exp\left[-B\left(\frac{\sigma}{k_B T}\right)^2\right]$$

wherein coefficient A and coefficient B are independent of a charge carrier concentration c and independent of $\sigma/k_B T$.

17. The method of claim 16, wherein the coefficient A is in a range from about 0.019 to about 0.029 and the coefficient B is about 0.154.

18. The method of claim 17, wherein the coefficient A is 0.024.

* * * * *